(12) United States Patent
Conners

(10) Patent No.: US 10,982,623 B2
(45) Date of Patent: Apr. 20, 2021

(54) PROPULSION SYSTEM FOR AN AIRCRAFT, A NOZZLE FOR USE WITH THE PROPULSION SYSTEM, AND A METHOD OF MANUFACTURING A PROPULSION SYSTEM FOR AN AIRCRAFT

(71) Applicant: Gulfstream Aerospace Corporation, Savannah, GA (US)

(72) Inventor: Timothy R. Conners, Tucson, AZ (US)

(73) Assignee: Gulfstream Aerospace Corporation, Savannah, GA (US)

( * ) Notice: Subject to any disclaimer, the term of this patent is extended or adjusted under 35 U.S.C. 154(b) by 220 days.

(21) Appl. No.: 16/131,240

(22) Filed: Sep. 14, 2018

(65) Prior Publication Data

US 2020/0088132 A1    Mar. 19, 2020

(51) Int. Cl.
*F02K 1/46*    (2006.01)
*F02K 1/34*    (2006.01)

(52) U.S. Cl.
CPC ............... *F02K 1/46* (2013.01); *F02K 1/34* (2013.01); *F05D 2220/30* (2013.01); *F05D 2220/80* (2013.01)

(58) Field of Classification Search
CPC ...... F02K 1/06–1292; F02K 1/15; F02K 1/18; F02K 1/46; F05D 2220/80
See application file for complete search history.

(56) References Cited

U.S. PATENT DOCUMENTS

| | | | | |
|---|---|---|---|---|
| 3,038,304 A | * | 6/1962 | Alford | F02K 1/1269 239/265.41 |
| 3,838,814 A | | 10/1974 | Henshaw et al. | |
| 4,026,472 A | * | 5/1977 | Rabone | F02K 1/08 239/127.3 |
| 4,930,309 A | * | 6/1990 | Hartman | F02K 7/12 417/173 |
| 2006/0242941 A1 | * | 11/2006 | Johnson | F02K 3/10 60/226.1 |
| 2016/0377026 A1 | * | 12/2016 | Roberge | F02K 1/002 415/1 |
| 2019/0195169 A1 | * | 6/2019 | Montes | F02K 1/1207 |
| 2020/0040843 A1 | * | 2/2020 | Pal | F02K 7/08 |

FOREIGN PATENT DOCUMENTS

EP         0385912 A2    9/1990
WO    2017218841 A1    12/2017

\* cited by examiner

*Primary Examiner* — Gerald L Sung
*Assistant Examiner* — William L Breazeal
(74) *Attorney, Agent, or Firm* — LKGlobal| Lorenz & Kopf, LLP

(57) ABSTRACT

A propulsion system for an aircraft includes: (1) an engine configured to generate a mass flow, (2) a nozzle having a pathway having a throat and a trailing edge, the throat or the trailing edge being configured to enlarge and contract, (3) a deployable obstructer disposed in the nozzle, (4) a first pressure sensor to sense the static pressure of the mass flow at the nozzle exit, (5) a second pressure sensor to sense the ambient pressure proximate the aircraft, and a (6) controller. The controller is coupled with the first and second pressure sensors, the deployable obstructer, and the throat or the trailing edge (whichever is configured to enlarge and contract). The controller receives the static and ambient pressures and when there is a disparity, the controller controls at least one of the deployable obstructer, the throat, and the trailing edge in a manner that reduces the disparity.

17 Claims, 13 Drawing Sheets

PROPULSION SYSTEM FOR AN AIRCRAFT, A NOZZLE FOR USE WITH THE PROPULSION SYSTEM, AND A METHOD OF MANUFACTURING A PROPULSION SYSTEM FOR AN AIRCRAFT

TECHNICAL FIELD

The present invention relates generally to an aircraft, and more particularly relates to a propulsion system for an aircraft that employs pressure disruption to shape an exhaust plume, and a method of manufacturing a propulsion system for an aircraft that employs pressure disruption to shape the exhaust plume.

BACKGROUND

An aircraft's sonic boom signature is sensitive to many features of the design, one of which is the shape of the jet plume leaving the engine. The more smoothly a jet plume's contour transitions from the nozzle exit (i.e., the exit plane), the less disruption the plume causes to the local flow field surrounding the nozzle and the less the plume contributes to the loudness of the sonic boom.

Creating a continuously smooth jet plume contour is difficult, and maintaining the smoothness of the contour across a range of aircraft flight conditions or engine power settings is even more challenging. A method for creating a continuously smooth jet plume at the design condition is addressed by U.S. Pat. No. 9,121,369 issued to Conners, Henne, and Howe. Maintaining the smoothness of the contour at off-design conditions is among the problems addressed herein.

At off-design conditions such as supersonic speeds above or below the design supersonic speed, the exhaust plume can be in one of two states—it can either be over expanded or under expanded. An over expanded condition of the exhaust plume is one where the ambient pressure of the free stream outside of the propulsion system exceeds the static pressure of the exhaust plume. In cases where the exhaust plume is over expanded, when the exhaust plume exits the propulsion system and encounters the freestream, the free stream will pinch down into the exhaust plume which will lead to an expansion of the freestream followed downstream by a recompression of the freestream to match ambient conditions. This expansion and recompression of the free stream gives rise to shocks which will increase the magnitude of the sonic boom on the ground.

An under expanded condition of the exhaust plume is the opposite. It is one where the static pressure of the exhaust plume exceeds the ambient pressure of the freestream. In cases where the exhaust plume is under expanded, when the exhaust plume exits the propulsion system and encounters the freestream, the exhaust plume will balloon (enlarge) in an outward direction into the path of the freestream. When the freestream encounters the sheer surface of the enlarged exhaust plume, the freestream will behave as if it had encountered a solid surface and instantly change direction. When the supersonic freestream changes direction, it will give rise to shocks which lead to an increased magnitude of the sonic boom as perceived on the ground.

Accordingly, it is desirable to provide a propulsion system that resolves off-design conditions such as the under expanded and/or the over expanded condition of the exhaust plume before the exhaust plume encounters the freestream. It is also desirable to provide a method of manufacturing such a propulsion system. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments/examples of a propulsion system for an aircraft, a nozzle for use with a propulsion system of an aircraft, and a method of manufacturing a propulsion system for an aircraft are disclosed herein.

In a first non-limiting embodiment, the propulsion system includes, but is not limited to, an engine that is configured to generate a mass flow. The propulsion system further includes, but is not limited to a nozzle that is coupled with the engine. The nozzle has a pathway extending therethrough. The pathway is configured to guide the mass flow. The pathway includes a throat and a trailing edge. The trailing edge defines an exit plane. At least one of the throat and the trailing edge are configured to enlarge and contract. The propulsion system further includes, but is not limited to, a first deployable obstructer disposed within the pathway. The first deployable obstructer is configured to move between a deployed position and a retracted position. The first deployable obstructer is configured to partially obstruct the pathway when the first deployable obstructer is out of the retracted position and to avoid obstructing the pathway when the first deployable obstructer is in the retracted position. The propulsion system further includes, but is not limited to, a first pressure sensor that is associated with the pathway and that is disposed to sense a static pressure of the mass flow at the trailing edge. The propulsion system further includes, but is not limited to, a second pressure sensor that is associated with the aircraft and that is disposed to sense an ambient pressure of a freestream proximate the aircraft. The propulsion system still further includes, but is not limited to, a controller that is communicatively coupled with the first pressure sensor and the second pressure sensor and that is operatively coupled with the first deployable obstructer and with the at least one of the throat and the trailing edge that is configured to enlarge and contract. The controller is configured to obtain the static pressure from the first pressure sensor, to obtain the ambient pressure from the second pressure sensor, to compare the static pressure with the ambient pressure. In response to a disparity between the static pressure and the ambient pressure, the controller is further configured to control at least one of the first deployable obstructer and the at least one of the throat and the trailing edge that is configured to enlarge and contract in a manner that reduces the disparity.

In another non-limiting embodiment, the nozzle includes, but is not limited to, a pathway extending through the nozzle. The pathway is configured to guide the mass flow. The pathway includes a throat and a trailing edge. The trailing edge defines an exit plane. At least one of the throat and the trailing edge is configured to enlarge and contract. The nozzle further includes, but is not limited to, a deployable obstructer disposed within the pathway. The deployable obstructer is configured to move between a deployed position and a retracted position. The deployable obstructer is configured to partially obstruct the pathway when the deployable obstructer is out of the retracted position and to avoid obstructing the pathway when the deployable obstructer is in the retracted position. The nozzle further includes, but is not limited to, a first pressure sensor associated with the pathway and disposed to sense a static pressure of the mass flow at the trailing edge. The nozzle further includes, but is not limited to, a second pressure sensor associated with an external surface of the nozzle and disposed to sense an ambient pressure of a freestream proximate the aircraft. The nozzle still further includes, but is not limited to, a controller that is communicatively coupled with the first pressure sensor and the second pressure sensor and that is operatively coupled with the deployable obstructer and with the at least one of the throat and the trailing edge that is configured to enlarge and contract. The controller is configured to obtain the static pressure from the first pressure sensor, to obtain the ambient pressure from the second pressure sensor, to compare the static pressure with the ambient pressure, and in response to a disparity between the static pressure and the ambient pressure, the controller is further configured to control at least one of the deployable obstructer and the at least one of the throat and the trailing edge that is configured to enlarge and contract in a manner that reduces the disparity.

In another non-limiting embodiment, the method of manufacturing a propulsion system for an aircraft includes, but is not limited to obtaining (1) an engine configured to generate a mass flow, (2) a nozzle having a pathway extending therethrough, the pathway configured to guide the mass flow, the pathway including a throat and a trailing edge, the trailing edge defining an exit plane, one of the throat and the trailing edge configured to enlarge and contract, (3) a deployable obstructer, (4) a first pressure sensor, (5) a second pressure sensor, and (6) a controller configured to be communicatively coupled with the first pressure sensor and the second pressure sensor and configured to be operatively coupled with the deployable obstructer and the one of the throat and the trailing edge configured to enlarge and contract, the controller configured to obtain a static pressure reading from the first pressure sensor and to obtain an ambient pressure reading from the second pressure sensor, to compare the static pressure with the ambient pressure, and when the controller determines an existence of a disparity between the static pressure and the ambient pressure, the controller is further configured to control at least one of the deployable obstructer and the one of the throat and the trailing edge configured to enlarge and contract in a manner that reduces the disparity. The method further includes, but is not limited to, assembling the deployable obstructer to the nozzle in a manner that permits the deployable obstructer to move between a retracted position and a deployed position. The deployable obstructer partially obstructs the pathway when the deployable obstructer is out of the retracted position and the deployable obstructer avoids obstructing the pathway when the deployable obstructer is in the retracted position. The method further includes, but is not limited to, associating the first pressure sensor with the nozzle in a first position that permits the first pressure sensor to sense a static pressure of the mass flow at the trailing edge. The method further includes, but is not limited to, associating the second pressure sensor with the nozzle in a second position that permits the second pressure sensor to sense the ambient pressure of a freestream around the aircraft. The method still further includes, but is not limited to, communicatively coupling the controller to the first pressure sensor and to the second pressure sensor, and operatively coupling the controller to the deployable obstructer and to the one of the throat and the trailing edge that is configured to enlarge and contract.

BRIEF DESCRIPTION OF THE DRAWINGS

The present invention will hereinafter be described in conjunction with the following drawing figures, wherein like numerals denote like elements.

DETAILED DESCRIPTION

Figure 1:
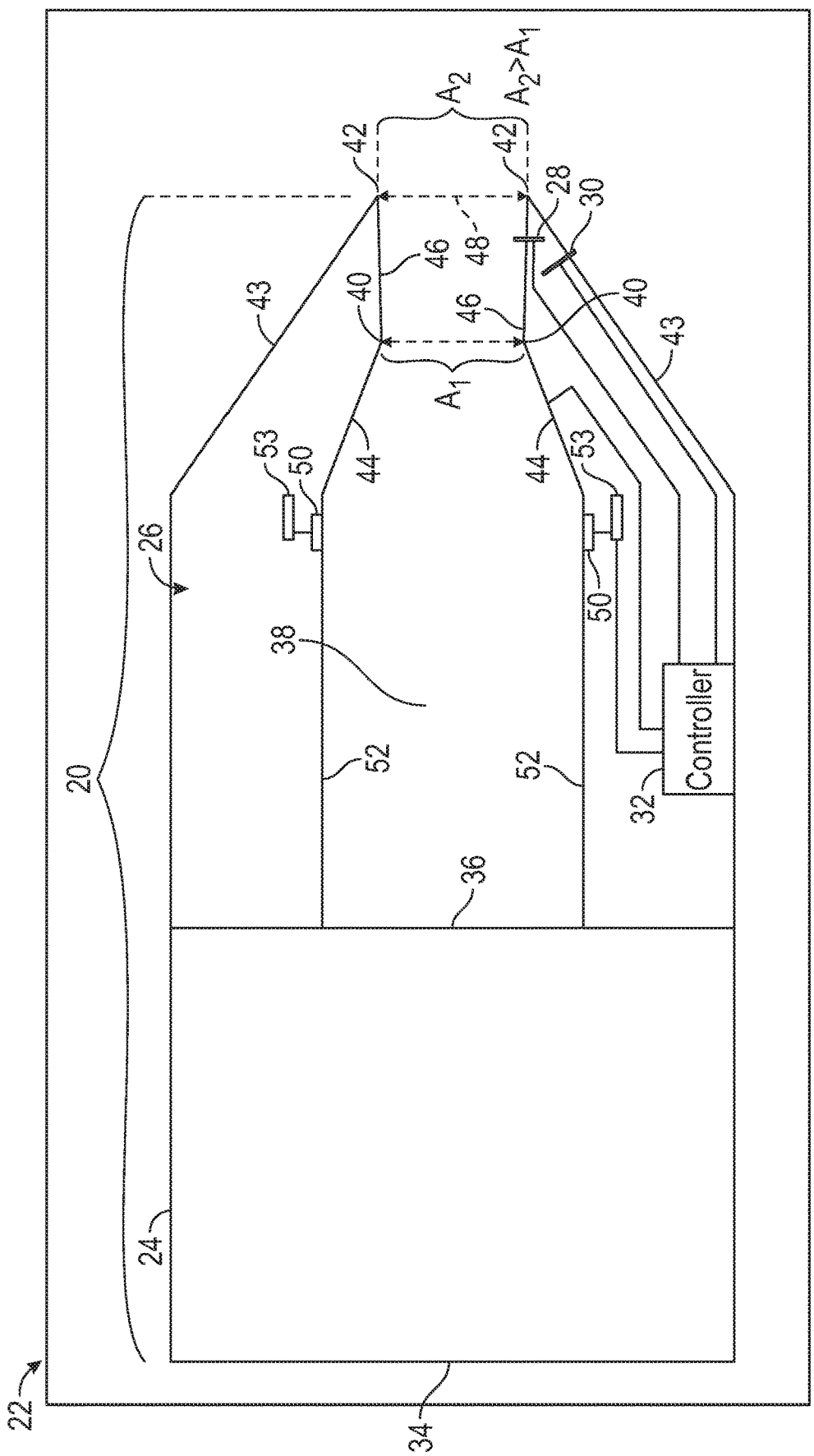
FIG. 1 is a schematic view illustrating a non-limiting embodiment of a propulsion system for an aircraft made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

An apparatus and method for creating a continuously smooth jet plume at off-design conditions through the use of reheat is addressed by U.S. application Ser. No. 15/985,947 submitted by Conners, Gavin, Howe, and Knight. U.S. application Ser. No. 15/985,947 is hereby incorporated in its entirety herein by reference. The solution set forth below teaches another approach to creating a continuously smooth jet plume at off-design conditions, an approach that entails the introduction of pressure disruption.

The first-order influence of pressure disruption on flow density makes it a powerful variable in determining the size and shape of a jet plume. Addressed by this disclosure, harnessing the effect of pressure disruption through the use of one or more deployable obstructers and a variable area nozzle (e.g., a nozzle throat and/or a nozzle exit that can be enlarged and contracted), the geometry of the jet plume can be precisely controlled. For low sonic boom applications, this enables the establishment of a smooth jet plume profile over a broader range of engine operating conditions than would be possible without such a system. The result is a quieter sonic boom signature across a wider operating range.

As used herein, the term "deployable obstructer" refers to a deployable obstructing component that is configured to move or be moved between a retracted position and a deployed position. The deployable obstructer is configured to obstruct the pathway of a nozzle of a propulsion system when the deployable obstructer has been moved, by any amount, out of the retracted position. In some embodiments, the deployable obstructer may comprise a single member while in other embodiments, the deployable obstructer may comprise an assembly of components configured to cooperate when moving between the retracted position and the deployed position. In some embodiments, the deployable obstructer may be configured to move to any intermediate position between the retracted and deployed position. In some embodiments, the deployable obstructer may translate between the retracted position and the deployed position. In other embodiments, the deployable obstructer may be configured to move telescopically between the retracted position and the deployed position. In other embodiments, the deployable obstructer may be configured to pivot between the retracted position and the deployed position. In other embodiments, the deployable obstructer may rotate between the retracted position and the deployed position. In still other embodiments, the deployable obstructer may have any suitable configuration effective to move or be moved between the retracted position and the deployed position. The deployable obstructer may have any suitable shape, configuration, and/or contour that permits the deployable obstructer to partially obstruct the pathway of the nozzle when the deployable obstructer has been moved out of the retracted position. Deployable obstructer may be fabricated from any suitable material effective to obstruct the mass flow and able to withstand the high temperatures and pressures of the mass flow as it moves through the nozzle. For example, and without limitation, the deployable obstructer may be fabricated from any suitable metal or ceramic material.

In a non-limiting embodiment, the propulsion system includes an engine that is configured to generate a mass flow. In the case of a gas turbine engine, the engine will consume air from the free stream, compress the air, add fuel, provoke combustion to rapidly expand the fuel and air mixture, and then exhaust the air, the remnants of the fuel (if any), and the products of combustion out of an aft end of the engine. This exhaust comprises the "mass flow" generated by the engine. The mass flow is routed through a nozzle that is fluidly coupled with the engine. At the aft end of the nozzle, the mass flow is vented into the freestream in the form of an exhaust plume. As used herein, the "mass flow" from the engine and the "exhaust plume" from the nozzle refers to the same moving mass, the primary difference being their differing downstream locations. Accordingly, the terms "mass flow" and "exhaust plume" may be used interchangeably throughout this document.

In a non-limiting embodiment, the nozzle has an internal pathway that extends through the nozzle from a forward end of the nozzle to the trailing end of the nozzle. The pathway is configured to receive the mass flow from the engine, to guide the mass flow towards the trailing edge of the nozzle, and to accelerate the mass flow prior to being vented from the trailing edge of the nozzle. The pathway has a throat that comprises the smallest cross-sectional area of the pathway. In an embodiment, either the throat or the trailing edge is configured to enlarge and to contract. In other embodiments, both the throat and the trailing edge may be configured to enlarge and contract.

In a non-limiting embodiment, the nozzle includes a deployable obstructer. In an example, the deployable obstructer may comprise one or more movable spoilers that are configured to move between a retracted position, where the spoilers do not extend into the pathway or otherwise impede the mass flow, and a deployed position, where the spoilers do extend into the pathway to partially obstruct the pathway, thereby impeding the mass flow as the mass flow moves through the pathway.

In other non-limiting embodiments, the deployable obstructer may comprise one or more movable vortex generators. In still other embodiments, the deployable obstructers may comprise a movable vane, a movable fence, a movable tab, or any other type of member or assembly, whether now known, or hereafter developed, that is configured to move between a retracted position where it does not obstruct the mass flow and a deployed position where it does partially obstruct the mass flow.

As is well known in the art, when a moving fluid is partially obstructed, the total pressure of the moving fluid and the velocity of the moving fluid are both diminished. Diminution of the total pressure of the moving fluid will reduce the density of the moving fluid. Diminution of the velocity of the moving fluid will increase the static pressure of the moving fluid. It is these principles that permits the subject propulsion system to shape the exhaust plume at off design conditions and to counteract the effects of either an over expanded mass flow or an under expanded mass flow, as discussed in detail below. In some embodiments, the deployable obstructer may be positioned upstream of the throat while in other embodiments, the deployable obstructer may be positioned downstream of the throat. As discussed in detail below, the location of the deployable obstructer with respect to the nozzle throat will impact the protocols employed to shape the exhaust plume.

The propulsion system further includes a first pressure sensor. In a non-limiting embodiment, the first pressure sensor may comprise a pressure tap, which is well known in the art. The first pressure sensor may be disposed in the pathway proximate the trailing edge or at any other suitable location that permits the first pressure sensor to sense the static pressure of the mass flow at the trailing edge.

The propulsion system further includes a second pressure sensor. In a non-limiting embodiment, the second pressure sensor may comprise a pressure tap. The second pressure sensor may be disposed along an external surface of the nozzle or at some other location on the aircraft that permits the second pressure sensor to sense the ambient pressure of the freestream proximate the trailing edge of the nozzle.

The propulsion system still further includes a controller. The controller is communicatively coupled with the first pressure sensor and the second pressure sensor and is operatively coupled with the deployable obstructer and with at least one of the throat or the trailing edge of the nozzle, whichever is configured to enlarge and contract. In embodiments where both the throat and the trailing edge are configured to enlarge and contract, the controller may be coupled with both the throat and the trailing edge.

The controller is configured to obtain the static pressure of the mass flow proximate the trailing edge from the first pressure sensor and to obtain the ambient pressure of the freestream proximate the trailing edge from the second pressure sensor. The controller is further configured to compare the static pressure of the mass flow with the ambient pressure of the free stream to determine whether there is a disparity between them. In some embodiments, the controller may be further configured to assess whether the disparity exceeds a predetermined tolerance.

If there is a disparity between the static pressure of the mass flow and the ambient pressure of the freestream, then there will either be a ballooning out or a pinching in of the exhaust plume when the mass flow moves past the trailing edge and encounters the freestream. The controller is configured to control the propulsion system by actuating at least one of (1) the deployable obstructer and (2) either the throat or the trailing edge, whichever is configured to enlarge and contract (in some embodiments, both the throat and the trailing edge are configured to enlarge and contract) to reduce and/or eliminate the disparity and reduce, minimize, or eliminate the ballooning out or the pinching in of the exhaust plume.

As set forth in detail below, the controller may actuate the deployable obstructer and enlarge the throat in embodiments where the deployable obstructer is disposed upstream of the throat and the mass flow is either over expanded or under expanded. Alternatively, the controller may enlarge the trailing edge without actuating the deployable obstructer in embodiments where the deployable obstructer is disposed downstream of the throat and the flow is under expanded. Further, the controller may actuate the deployable obstructer without enlarging the trailing edge in embodiments where the deployable obstructer is disposed downstream of the throat and the flow is over expanded. These actions are calculated to impact the static pressure of the mass flow at the trailing edge such that it is increased or decreased as needed to cause it to be substantially equal to the ambient pressure at the trailing edge.

In some embodiments, the controller is configured to use the disparity to calculate an amount by which to increase static pressure of the mass flow in order to match the ambient pressure (in instances where the flow is over expanded). Once the needed increase in static pressure has been calculated, the controller is configured to calculate the amount/extent of deployment of the deployable obstructer(s) that will be needed to achieve the static pressure increase. The controller will base this calculation on the known relationship between the amount of obstruction of the pathway through the nozzle and the resulting amount of pressure disruption of the mass flow. The controller will further base this calculation on the known relationship between the amount of pressure disruption of the mass flow and the resulting reduction in mass flow velocity. The controller will further base this calculation on the known relationship between the reduction in mass flow velocity and the resulting increase in static pressure of the mass flow. Accordingly, when the disparity in static and ambient pressure is known, the controller is configured to use the disparity to determine the amount of deployable obstructers to deploy or the extent to which the deployable obstructers should be deployed, or both, in order to reduce or eliminate the disparity.

In other embodiments, when faced with an over expanded mass flow, rather than calculate how many deployable obstructers should be deployed from their retracted position or how far each deployable obstructer should be deployed, the controller instead may be configured to incrementally or continuously deploy the deployable obstructer(s) and to continuously monitor the disparity during such deployment to determine when the disparity has been sufficiently reduced. The controller is further configured to discontinue the incremental or continuous deployment of the deployable obstructers and to maintain the deployable obstructers in their current state of deployment when the disparity is either eliminated or reduced to within a predetermined tolerance.

In still other embodiments, any other deployment protocol that is effective to reduce or eliminate the disparity may also be employed without departing from the teachings of the present disclosure.

In situations where the flow is over expanded and the deployable obstructers are positioned upstream of the nozzle throat, the nozzle throat must be enlarged when the deployable obstructers are deployed. This is because deployment of the deployable obstructers will reduce the total pressure of the mass flow which, in turn, will reduce the density of the mass flow. In order to maintain a constant mass flow rate (which is necessary to avoid increasing backpressure on the turbo machinery of the gas turbine engine), the nozzle throat must be enlarged. By enlarging the nozzle throat, a greater amount of fluid is permitted to pass through the nozzle throat. Allowing a greater amount of a less dense fluid to pass through the nozzle throat will enable the nozzle to maintain a substantially constant mass flow rate. In this manner, the pinching in and/or the ballooning out of the exhaust plume is reduced, minimized or avoided altogether without disrupting or altering the mass flow rate of the mass flow through the propulsion system. As an added benefit, opening the throat may also lead to a reduction in the boat tail angle, thereby reducing the magnitude of the sonic boom generated by interaction between the free stream and the exhaust plume.

A greater understanding of the propulsion system, the nozzle, and the method of manufacturing discussed above may be obtained through a review of the illustrations accompanying this application together with a review of the detailed description that follows.

FIG. 1 is a schematic view illustrating a non-limiting embodiment of a propulsion system 20 for use with an aircraft 22. In the present embodiment, aircraft 22 comprises a fixed wing, supersonic aircraft, however it should be understood that the teachings herein are not limited for use only with fixed wing, supersonic aircraft. Rather, the teachings disclosed herein are compatible with any other type of aircraft that generates an exhaust plume.

Propulsion system 20 is configured to generate thrust to propel aircraft 22. Propulsion system 20 includes an engine 24, a nozzle 26, a static pressure sensor 28, an ambient pressure sensor 30, a deployable obstructer 50, and a controller 32. For ease of reference, static pressure sensor 28 and ambient pressure sensor 30, may be referred to collectively hereinafter as "the pressure sensors 28 and 30". In other embodiments, propulsion system 20 may include additional components without departing from the teachings of the present disclosure. For example, in other embodiments, propulsion system 20 may further include an inlet, a compression surface, a nacelle, and the like.

In the illustrated embodiment, engine 24 comprises a gas turbine engine. Accordingly, at a forward end 34, engine 24 takes air in from the freestream, compresses it with a compressor (not shown), and adds fuel and sparks to the air to ignite the mixture in a combustion chamber (not shown). In the combustion chamber, once the mixture is ignited, it becomes a rapidly expanding heated fluid that is expelled downstream. As it is expelled from the combustion chamber, the rapidly expanding, fast moving heated fluid passes over, and spins, a turbine (not shown) and is then exhausted at aft end 36 into nozzle 26. This heated, expanding, rapidly moving fluid comprises both the mass flow and the exhaust plume that are referred to throughout this disclosure. When the fluid is moving through engine 24 and nozzle 26, it is commonly known as the "mass flow" and when the fluid exits an aft end of nozzle 26, it is commonly known as the "exhaust plume". However, the terms "mass flow" and "exhaust plume" may be used interchangeably throughout this Application.

It should be understood that the teachings herein are not limited to use with a gas turbine engine. Any other suitable engine effective to generate a mass flow/exhaust plume may be used with propulsion system 20 without departing from the teachings of the present disclosure. For example, a ramjet, a rocket engine, and the like would be compatible with the teachings disclosed herein.

With continuing reference to FIG. 1, nozzle 26 comprises an axisymmetric converging/diverging nozzle that is fluidly coupled with an aft portion of engine 24 to receive the mass flow. While the present disclosure teaches the use of a nozzle that is axisymmetric and that has a converging/diverging configuration, it should be understood that the teachings herein are not limited to only axisymmetric and/or converging/diverging nozzles, but rather, the teachings herein are compatible with other types of nozzles as well.

Nozzle 26 includes a pathway 38, defined by internal surface 52, that is configured to guide and accelerate the mass flow as it moves from engine 24 through nozzle 26 and on to the point where it is exhausted into the freestream as an exhaust plume. Pathway 38 includes a throat 40 and a trailing edge 42. Throat 40 is the narrowest point along pathway 38 and has a cross-sectional area of A1. Trailing edge 42 is the aft-most portion of nozzle 26 and has a cross sectional area of A2. In the illustrated embodiment, because nozzle 26 is a converging/diverging nozzle, A2 is greater than A1. Trailing edge 42 defines an exit plane 48. Exit plane 48 represents an imaginary boundary between the upstream space inside of nozzle 26, on the one hand, and the downstream space outside of nozzle 26, on the other hand. Once the mass flow passes through exit plane 48, the mass flow encounters the freestream and becomes the exhaust plume.

Immediately upstream of throat 40 is converging wall 44. Converging wall 44 has a cross-sectional area that is continuously diminishing in the downstream direction. The continuously narrowing cross-sectional area of converging wall 44 will accelerate the mass flow, giving it a continuously increasing velocity. However, as is well known in the art, the mass flow cannot reach or exceed the local speed of sound until it reaches throat 40.

In the embodiment illustrated in FIG. 1, throat 40 is configured to choke the mass flow. As is well known in the art, a "choked" mass flow is a mass flow that has been accelerated to the local speed of sound ("sonic speed"). The flow will be choked when the mass flow has an appropriate amount of stagnation pressure and when the throat has an appropriately dimensioned cross-sectional area. As is well known to those of ordinary skill in the art, the appropriate dimensions for throat 40 needed to choke the mass flow are determined based on the stagnation pressure of the mass flow. The stagnation pressure of the mass flow is typically a known or ascertainable value.

Aft of throat 40, the mass flow encounters diverging wall 46. As is well known in the art, when a sonic or supersonic flow encounters a diverging pathway, the flow will expand and accelerate. Accordingly, diverging wall 46 has the effect of accelerating the mass flow from sonic speed to a supersonic speed. As the mass flow moves aft of throat 40 and accelerates through pathway 38 guided by diverging wall 46, the static pressure of the mass flow will diminish due to its increasing velocity and its expanding boundaries. The extent to which the static pressure of the mass flow diminishes is a function of the cross-sectional area of diverging wall 46 and trailing edge 42, among other factors. Generally, the greater the cross-sectional area of pathway 38 downstream of throat 40 and the greater the cross-sectional area of trailing edge 42, the lower the static pressure of the mass flow will be when it reaches the end of pathway 38, and vice versa.

In the embodiment illustrated in FIG. 1, throat 40 can be enlarged and contracted. In this embodiment, trailing edge 42 is not independently controlled so changes in the dimensions of trailing edge 42 depend on changes in the dimensions of throat 40. An embodiment where the dimensions of the throat and the trailing edge can be independently adjusted will be addressed below. Methods and mechanisms for enlarging and contracting a nozzle's throat and trailing edge are well known in the art and, for the sake of brevity, will not be described in detail here. Rather, it should be understood that any method or mechanism that is effective to selectively enlarge and contract the throat and/or the trailing edge, whether now known or hereafter developed, is suitable for use with propulsion system 20. In the illustrated embodiment, enlargement and contraction of throat 40 can be accomplished by changing the slope of converging wall 44. In a non-limiting embodiment, converging wall 44 may be configured to pivot about a hinge (not shown) and such pivotal movement may be controlled by an actuator (not shown). Other configurations are also possible and would fall within the contemplation of the present disclosure. As the slope of converging wall 44 is reduced, the cross-sectional area of throat 40 is enlarged and as the slope of converging wall 44 is increased, the cross-sectional area of throat 40 is contracted. As further illustrated in FIG. 1, the cross-sectional area of trailing edge 42 is linked directly with the cross-sectional area of throat 40 because trailing edge 42 and throat 40 are part of a unitary structure.

Accordingly, as the cross-sectional area of throat 40 is increased, the cross-sectional area of trailing edge 42 is also increased, and vice versa. An embodiment where the cross-sectional area of throat 40 and the cross sectional area of trailing edge 42 are independent of one another will be discussed below.

As the cross-sectional area of trailing edge 42 is increased, the slope of outer wall 43 is reduced. As the slope of outer wall 43 is reduced, the boat tail angle (i.e., the angle between the direction of flow of the freestream approaching trailing edge 42 along outer wall 43 and the direction of flow of the exhaust plume exiting trailing edge 42) of nozzle 26 will correspondingly be reduced. This is desirable because the shallower that the boat tail angle is, the weaker the shock will be that results from the interaction between the freestream and the exhaust plume. Thus, when throat 40 is enlarged, the boat tail angle is reduced and the strength of any shock resulting from interaction between the freestream and the exhaust plume will be diminished.

Intervention by an engine control system notwithstanding, the ability to control the cross-sectional area of throat 40 provides the ability to control the mass flow rate through throat 40. The equation for calculating the mass flow rate through throat 40 is as follows:

Mass flow rate=(mass flow density)×(cross-sectional area of throat)×(velocity of mass flow)

The density of the mass flow is closely linked with total pressure. The relationship between the density of the mass flow and total pressure is as follows:

Density ∝(Total pressure)/(Total Temperature)×(Gas Constant)

From the first equation, it is clear that the larger the cross-sectional area of a choked throat is, the greater the mass flow rate through the throat will be for a given flow density, and vice versa. Also, the greater the density of the mass flow for a given choked throat area, the greater the mass flow rate will be, and vice versa. However, as discussed below, the density of the mass flow is based on the pressure and temperature of the mass flow, so as long as the pressure and temperature of the mass flow remain constant, the density of the flow will also remain constant. It is also clear that the greater the velocity of the mass flow through the throat, the greater the mass flow will be. However, with a choked flow, the velocity will be constant (sonic speed) provided that there is no change in temperature of the flow through the throat. Accordingly, at a constant pressure, the primary factor affecting the mass flow rate will be the cross-sectional area of throat 40. Thus, enlarging throat 40 will increase the mass flow rate.

From the second equation, the lower the total pressure of the mass flow is, the lower the density of the mass flow will be. Because the fluid in question (the mass flow) is in a gaseous state at all times relevant to this analysis, the stagnation pressure of the fluid and the total pressure of the fluid will be substantially identical. Accordingly, in the analysis that follows, the term "stagnation pressure" and the term "total pressure" may be used interchangeably. Reducing the total pressure of the mass flow will reduce its density when temperature is held constant. When the density of the mass flow is reduced, the mass flow rate is reduced. Reduction of the total pressure of the mass flow also results in slowing the mass flow. The reduced velocity of the mass flow yields an increase the static pressure of the mass flow. Thus, reducing the total pressure of the mass flow enhances the ability of the mass flow to resist or push back against a higher ambient pressure of the freestream (such as in the case of an over-expanded flow).

From the above two equations, it becomes clear that the mass flow rate can be manipulated by enlarging and contracting throat 40 and by increasing and decreasing the total pressure of the mass flow. From this it follows that an increase in the mass flow rate through throat 40 caused by increasing the cross-sectional area of throat 40 can be off-set by reducing the total pressure of the mass flow. Similarly, a reduction in the mass flow rate caused by a diminution in total pressure can be off-set by enlarging throat 40 by an appropriate amount.

In addition to controlling the mass flow rate through throat 40 by enlarging or contracting throat 40, nozzle 26 is further configured to control the mass flow rate through throat 40 by changing the total pressure of the mass flow. To change the total pressure of the mass flow, nozzle 26 includes at least one deployable obstructer 50. As set forth above, deployable obstructer 50 may comprise any suitable structure or assembly of structures that is configured to obstruct a portion of pathway 38 and to impede the movement of the mass flow as it moves from aft end 36 of engine 24 towards exit plane 48. As discussed in detail below, deployable obstructer 50 may be embedded in, and arranged circumferentially around, internal surface 52 of nozzle 26. In FIG. 1, deployable obstructer 50 is disposed in a retracted position where it is flush with internal surface 52 and does not impede the downstream movement of the mass flow through pathway 38.

As illustrated in FIG. 1, deployable obstructer 50 is coupled with an actuator 53. Actuator 53 may be any suitable machine, mechanism, device, or component that is configured to move deployable obstructer 50 between the retracted position and the deployed position. In some embodiments, deployable obstructer 50 may include an integrated actuator such that deployable obstructer 50 and actuator 53 comprise a single component.

Deployable obstructer 50 is configured to be operatively coupled with controller 32 and is configured to deploy and retract in response to signals received from controller 32. In the illustrated embodiment, deployable obstructer 50 is operatively coupled to controller 32 via actuator 53. In embodiments where deployable obstructer 50 and actuator 53 comprise a single component, controller 32 may be directly operatively coupled with deployable obstructer 50. For ease of reference, this document will refer to controller 32 as being operatively coupled with deployable obstructer 50 regardless of whether controller 32 is directly coupled with deployable obstructer 50 or whether controller 32 is indirectly coupled with deployable obstructer 50 through actuator 53 or through any other component.

With continuing reference to FIG. 1, static pressure sensor 28 and ambient pressure sensor 30 comprise any suitable pressure sensor, whether now known or hereinafter developed, that is effective to sense pressure. In the illustrated embodiment, static pressure sensor 28 and ambient pressure sensor 30 are depicted as extending above the surfaces of nozzle 26 to which they are mounted. It should be understood that this depiction was for the ease of illustration only. In practice, static pressure sensor 28 and ambient pressure sensor 30 are likely to comprise pressure taps which are sensors that are positioned within relatively small openings in the surfaces of nozzle 26. In such embodiments, static pressure sensor 28 and ambient pressure sensor 30 would not protrude above their adjacent surfaces or otherwise extend out into the mass flow or the free stream.

Static pressure sensor 28 is positioned and/or configured to sense the pressure of the mass flow immediately upstream of exit plane 48. Ambient pressure sensor 30 is positioned and/or configured to sense the ambient pressure proximate exit plane 48. Static pressure sensor 28 and ambient pressure sensor 30 are electronic components that are configured to be communicatively coupled with other electronic components. Each of these sensors may each be configured to automatically send pressure readings to another component of propulsion system 20 such as controller 32 or to any other component. Alternatively, these pressure sensors may each be configured to send pressure readings to a component of propulsion system 20 such as controller 32 or to any other component in response to a request communicated by such other component.

Controller 32 may be any type of computer, processor, micro-controller, circuitry, chipset, computer system, or microprocessor that is configured to perform algorithms, to execute software applications, to execute sub-routines and/or to be loaded with and to execute any other type of computer program. Controller 32 may comprise a single processor or a plurality of processors acting in concert. In some embodiments, controller 32 may be dedicated for use exclusively with propulsion system 20 while in other embodiments controller 32 may be shared with other systems on board aircraft 22.

Controller 32 is communicatively coupled to static pressure sensor 28 and ambient pressure sensor 30 and is operatively coupled with converging wall 44 (and in some cases, diverging wall 46) and with deployable obstructer 50. Such coupling may be accomplished through the use of any suitable means of transmission including both wired and wireless connections. For example, each component may be physically connected to controller 32 via a coaxial cable or via any other type of wired connection effective to convey signals. In the illustrated embodiment, controller 32 is directly communicatively connected to each of the other components. In other embodiments, each component may be communicatively connected to controller 32 across a communications bus. In still other examples, each component may be wirelessly connected to controller 32 via a BLUETOOTH CONNECTION, a WIFI connection, a dedicated short-range radio transmission system, or the like.

Being communicatively and operatively coupled provides a pathway for the transmission of commands, instructions, interrogations, and other signals between controller 32 and each of the other components. Through this coupling, controller 32 may control and/or communicate with each of the other components of propulsion system 20, and each of the components of propulsion system 20 discussed above are configured to interface, engage with, and respond to controller 32. For example, static pressure sensor 28 and ambient pressure sensor 30 are each configured to communicate their respective pressure readings to controller 32. Converging wall 44 is configured to respond to instructions to increase or decrease its slope and thereby contracting or enlarging, respectively, the cross-sectional area of throat 40 in response to instructions received from controller 32. Deployable obstructer 50 is also configured to deploy and retract in response to instructions received from controller 32, thereby adding pressure disruption and removing pressure disruption, respectively, from the mass flow passing through pathway 38.

Controller 32 is configured to interact with, coordinate and/or orchestrate the activities of each of the other components of propulsion system 20 discussed above for the purpose of shaping the exhaust plume in a manner that reduces, minimizes, and/or eliminates a detected over-expanded or under-expanded condition of the mass flow. To accomplish this, controller 32 is programmed and/or otherwise configured to determine whether an over-expanded condition or an under-expanded condition of the mass flow currently exists and to then address it through the introduction of pressure disruption to the mass flow and through the enlargement (or contraction) of throat 40.

To determine whether an over-expanded condition or an under-expanded condition exists, controller 32 is configured to obtain the static pressure of the mass flow from static pressure sensor 28 and to obtain the ambient pressure of the freestream from ambient pressure sensor 30. Controller 32 may be configured to automatically interrogate the pressure sensors 28 and 30 periodically or in response to a user request/input or in response to an indication from some other system, whether on board or external to aircraft 22, that the sonic boom generated by aircraft 22 is approaching or has exceeded designated limits. Alternatively, the pressure sensors 28 and 30 may be configured to automatically provide their respective pressure readings to controller 32 continuously or at predetermined intervals.

Once controller 32 obtains the static pressure reading for the mass flow and the ambient pressure reading for the freestream, controller 32 is configured to compare the two readings with one another. If the pressure readings are the same or if there is no substantially disparity between the pressure readings, controller 32 is configured to take no further action until such time that there exists a substantial disparity between the two pressure readings. What constitutes a "substantial" disparity between the pressure readings may be based on jurisdictional thresholds for sonic boom magnitudes. For example, controller 32 may be configured to respond to user inputs to tune the amount of disparity that will be acceptable. This will permit members of an aircrew to adjust the sensitivity of controller 32 as aircraft 22 flies from one jurisdiction into another. In other embodiments, controller 32 may be configured to obtain position information for aircraft 22 from an onboard Global Positioning Satellite system or an inertial navigation system, or the like, and from that, through the use of a look-up table or other means, determine the jurisdiction that aircraft 22 is presently flying over and, in turn, determine a corresponding jurisdictional limit on sonic boom magnitude which would provide controller 32 with the guidance it would need to appropriately calibrate an acceptable disparity. Alternatively, a predetermined range of acceptable disparities may be programmed into controller 32, such as one which would encompass all known jurisdictional limitations on sonic boom magnitude. In still other embodiments, controller 32 may be configured to respond with mitigating efforts in the presence of any disparity between the static pressure reading provided by static pressure sensor 28 and the ambient pressure reading provided by ambient pressure sensor 30. Controller 32 is further configured such that when it determines that the disparity between the static pressure of the mass flow and the ambient pressure of the freestream exceeds the acceptable threshold, controller 32 will take mitigating actions.

As stated above, the disparity will relate to an off-design condition that will either comprise an over-expanded flow condition or an under-expanded flow condition. An over-expanded flow condition is illustrated in FIG. 2 and an under-expanded flow condition is illustrated in FIG. 3.

Figure 2:
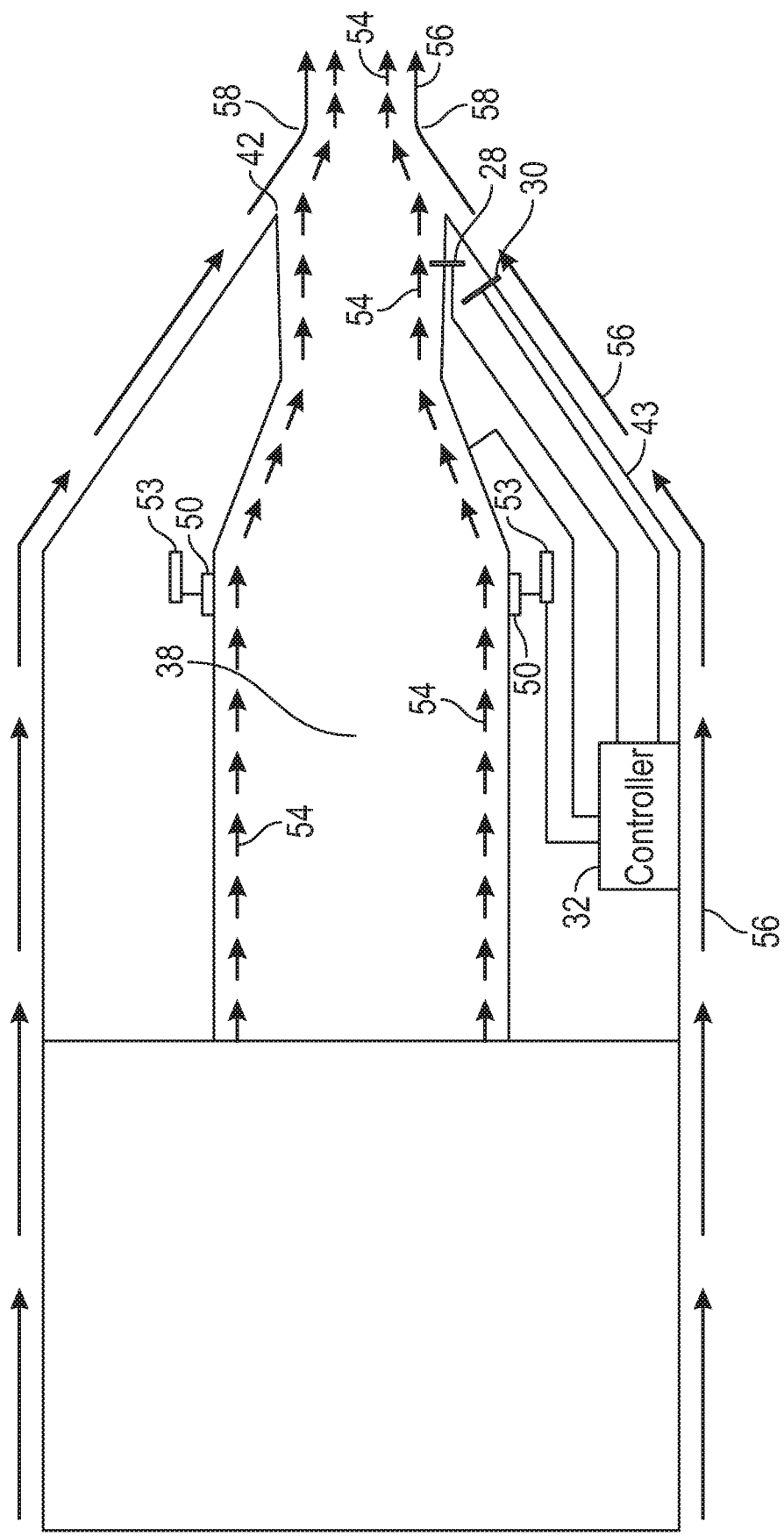
FIG. 2 is a schematic view illustrating the propulsion system of FIG. 1 operating at an off-design condition that gives rise to an over-expanded exhaust plume.

With continuing reference to FIG. 1, FIG. 2 illustrates a mass flow 54 flowing through pathway 38. Static pressure sensor 28 senses the static pressure of mass flow 54 as mass flow 54 flows past/over static pressure sensor 28. This static pressure measurement is then transmitted to controller 32. At the same time, freestream 56 flows over outer wall 43 and past/over ambient pressure sensor 30. Ambient pressure sensor 30 senses the ambient pressure of freestream 56 as it flows past and transmits the ambient pressure to controller 32. In FIG. 2, the magnitude of the ambient pressure of freestream 56 exceeds the static pressure of mass flow 54. For this reason, when the two flows meet at trailing edge 42, freestream 56 presses down around mass flow 54, compressing it to a narrower cross-sectional area until equilibrium is reached at location 58. At location 58, freestream 56 is forced to change direction because of the equalized pressure and this change in direction causes a shock (not shown) to form and propagate outwardly from location 58. Beyond location 58, mass flow 54 (now referred to as exhaust plume 54) and freestream 56 flow parallel to one another because their respective pressures have equalized.

Figure 3:
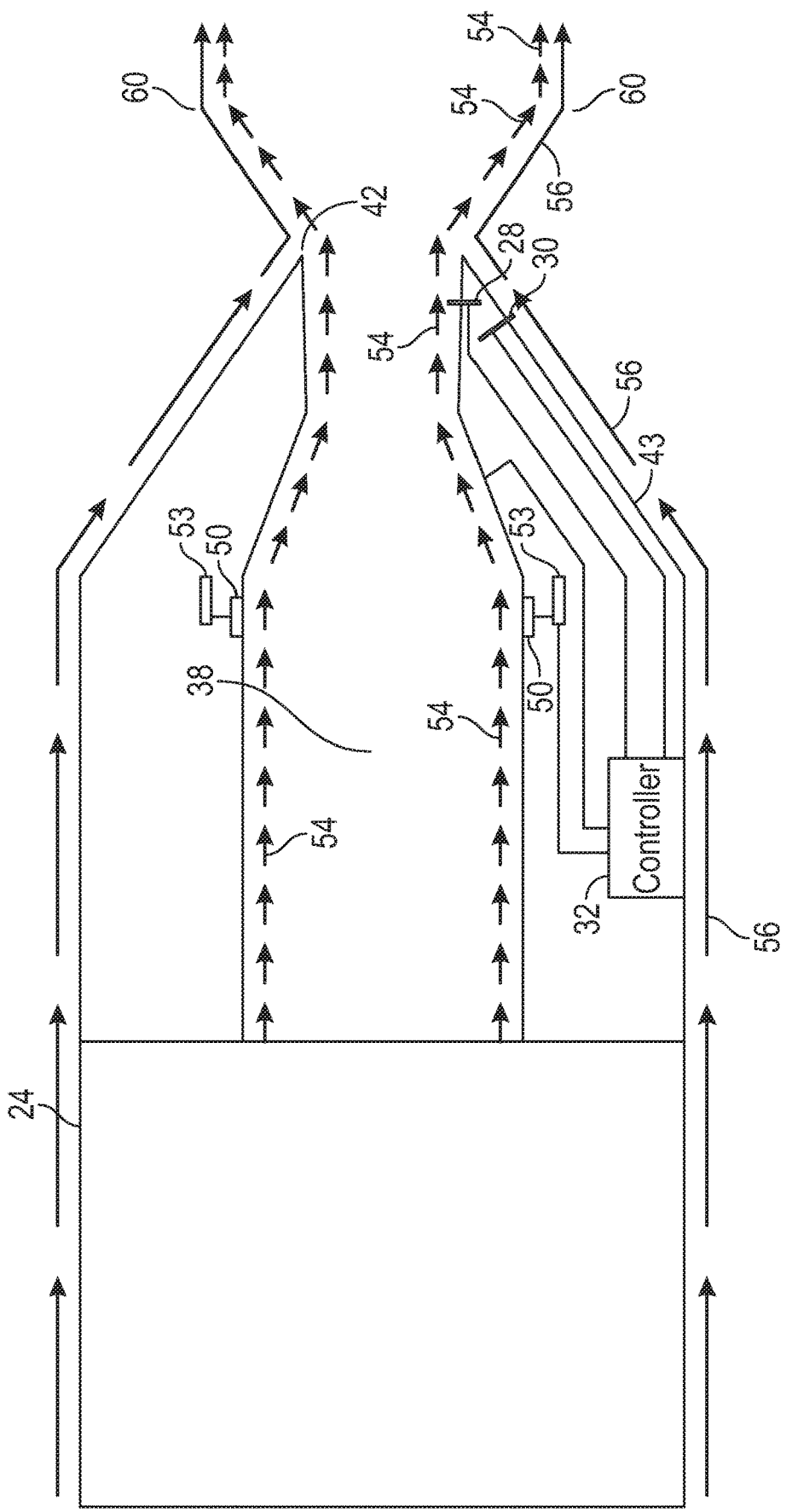
FIG. 3 is a schematic view illustrating the propulsion system of FIG. 1 operating at an off-design condition that gives rise to an under-expanded exhaust plume.

With continuing reference to FIGS. 1 and 2, FIG. 3 illustrates a mass flow 54 flowing through pathway 38. Static pressure sensor 28 senses the static pressure of mass flow 54 as mass flow 54 flows past/over static pressure sensor 28. This static pressure measurement is then transmitted to controller 32. At the same time, freestream 56 flows over outer wall 43 and past/over ambient pressure sensor 30. Ambient pressure sensor 30 senses the ambient pressure of freestream 56 as it flows past and transmits the ambient pressure to controller 32. In FIG. 3, the magnitude of the static pressure of mass flow 54 exceeds the ambient pressure of freestream 56. For this reason, when the two flows meet at trailing edge 42, mass flow 54 (now referred to as exhaust plume 54) presses outwardly against freestream 56 as exhaust plume 54 (previously, mass flow 54) expands to a larger cross-sectional area. The outward expansion of exhaust plume 54 causes freestream 56 to change direction at trailing edge 42. This change in direction of freestream 56 compresses freestream 56 which, in turn, gives rise to a shock (not shown) that propagates in all directions and that contributes to the perceived loudness of the sonic boom generated by aircraft 22. The compression of freestream 56 will continue until equilibrium is reached at location 60. Beyond location 60, exhaust plume 54 and freestream 56 will flow parallel to one another because their respective pressures have equalized.

With continuing reference to FIGS. 1 and 2, when the disparity arises from a condition wherein mass flow 54 is over-expanded, controller 32 is configured to actuate deployable obstructer 50 for the purpose of adding an amount of obstruction to pathway 38 to, in turn, introduce pressure disruption into mass flow 54. The amount of obstruction added by deployable obstructer 50 is calculated by controller 32 as being the amount necessary to reduce the velocity of mass flow 54 by an amount necessary to increase its static pressure to permit it to achieve a fully expanded state at the nozzle exit 42. The precise amount of pathway obstruction that is needed to reduce the disparity down to zero or down to some other predetermined acceptable level can be determined through the use of look-up tables derived apriori. Alternatively, the controller may be configured to determine in real time the precise amount of pathway obstruction to present to the mass flow needed to bring the disparity between the ambient pressure of the freestream and the static pressure of the mass flow down to within some predetermined tolerance. The controller accomplishes this calculation using relationships that are well known to those of ordinary skill in the art.

In some embodiments, depending on the total pressure of the flow and the total amount of pathway obstruction that deployable obstructer 50 (or that a plurality of deployable obstructers 50) may be capable of introducing into the mass flow, it may not be practical to add the full amount of pathway obstruction required to completely offset the disparity. In such cases, controller 32 may be configured to add as much pathway obstruction as is practical in view of this or other limiting factors. In such cases, the disparity may not be completely offset, but rather may only be diminished.

While the obstruction of pathway 38 and the resulting pressure disruption of mass flow 54 will mitigate, reduce, and/or eliminate the disparity between the static pressure of mass flow 54 and the ambient pressure of freestream 56, it will give rise to a new problem—it will reduce the density of mass flow 54. As discussed above, when the density of a mass flow is reduced, the mass flow rate will also be reduced. If no action is taken to offset the reduced mass flow rate of mass flow 54 through throat 40, then back pressure will build and be applied to aft end 36 of engine 24. This rising back pressure may negatively impact the turbomachinery of engine 24 and cause it to operate sub-optimally. This is undesirable.

With continuing reference to FIGS. 1-3, FIG. 4 illustrates a solution to the secondary problem of a reduction of the density of mass flow 54 caused by obstructing pathway 38 and disrupting the total pressure of mass flow 54. For simplification, the illustration presented in FIG. 4 omits mass flow 54, freestream 56, controller 32, and the pressure sensors 28 and 30.

Figure 4:
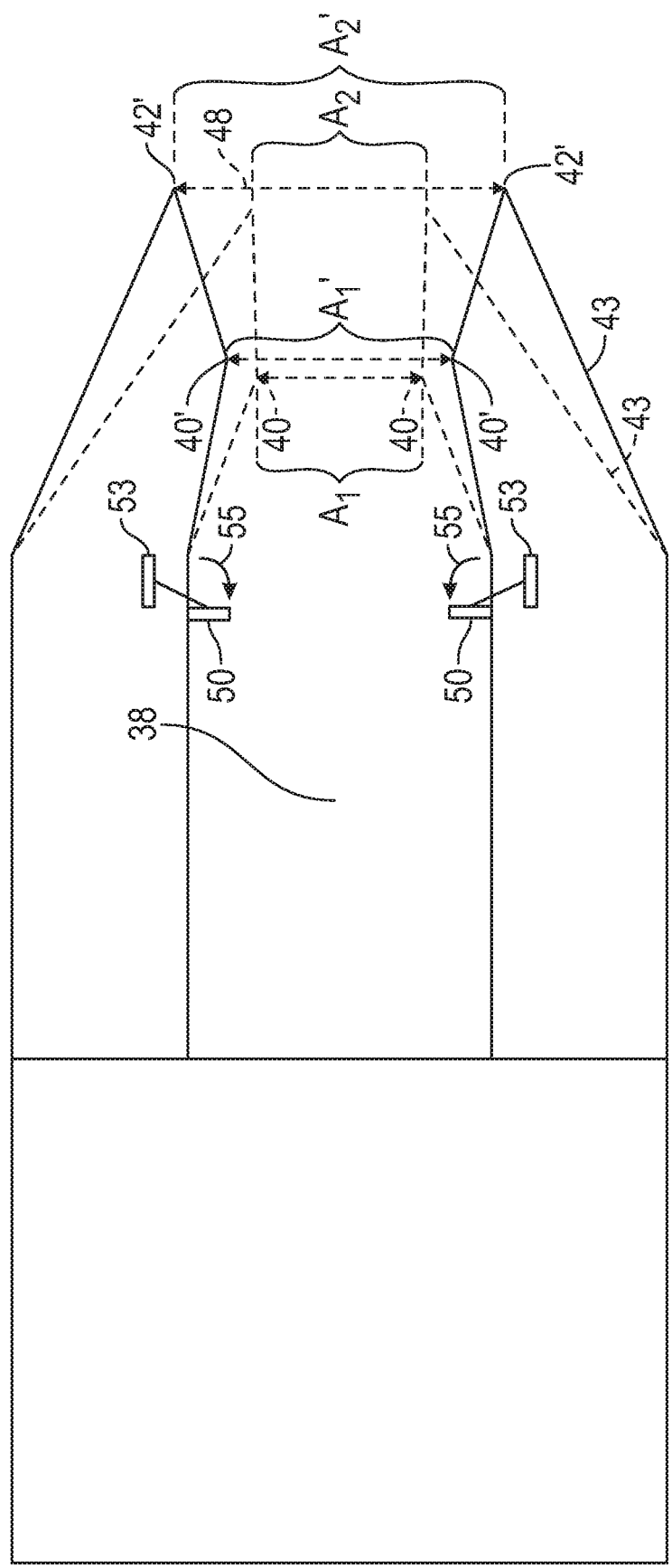
FIG. 4 is a schematic view illustrating actuation of countermeasures available to the propulsion system of FIG. 1 in response to detection of the over-expanded exhaust plume of FIG. 2 and/or the under-expanded exhaust plume of FIG. 3.
Figure 5:
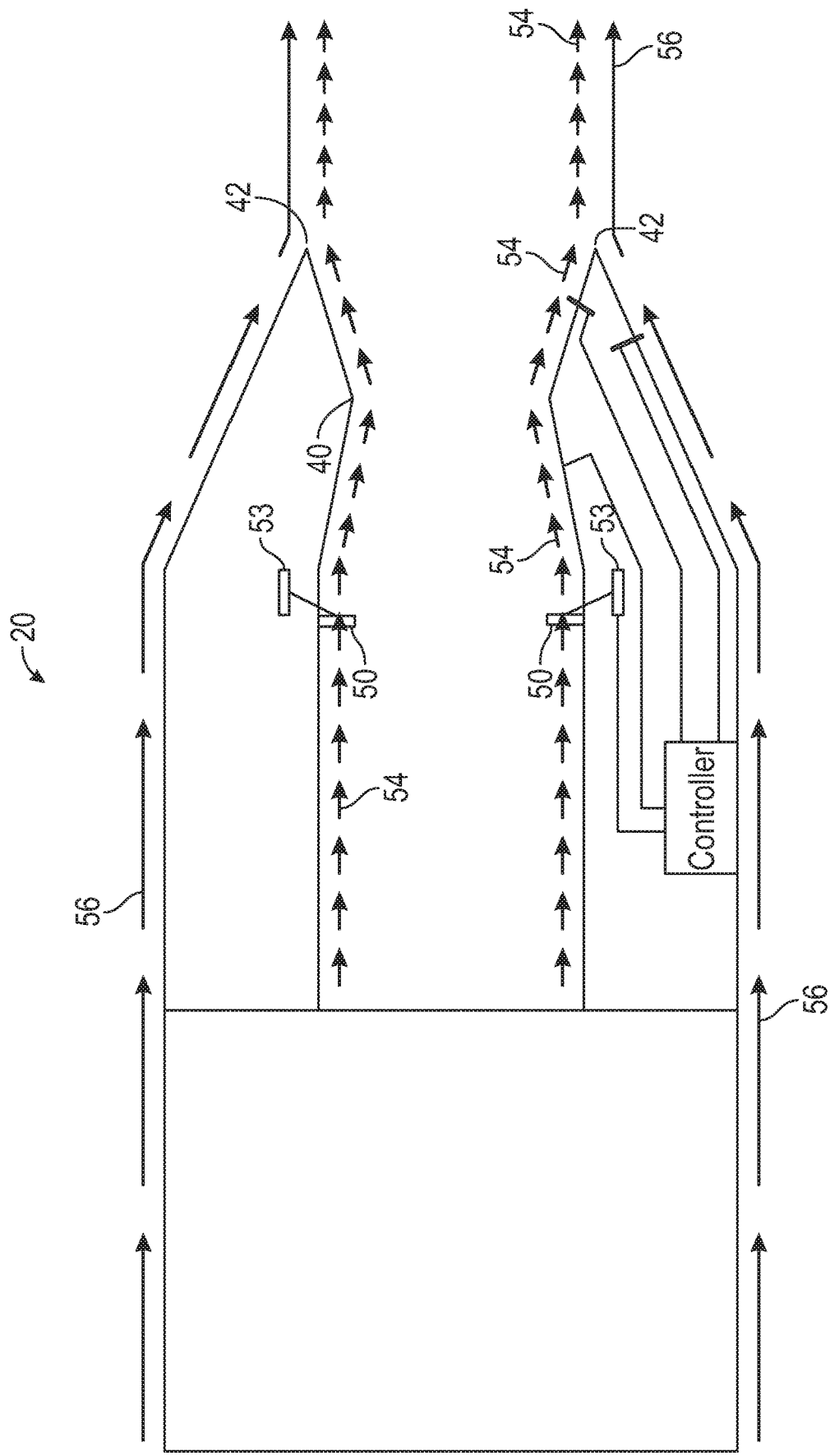
FIG. 5 is a schematic view illustrating the propulsion system of FIG. 1 operating at an off-design condition during actuation of the countermeasures illustrated in FIG. 4.
Figure 6:
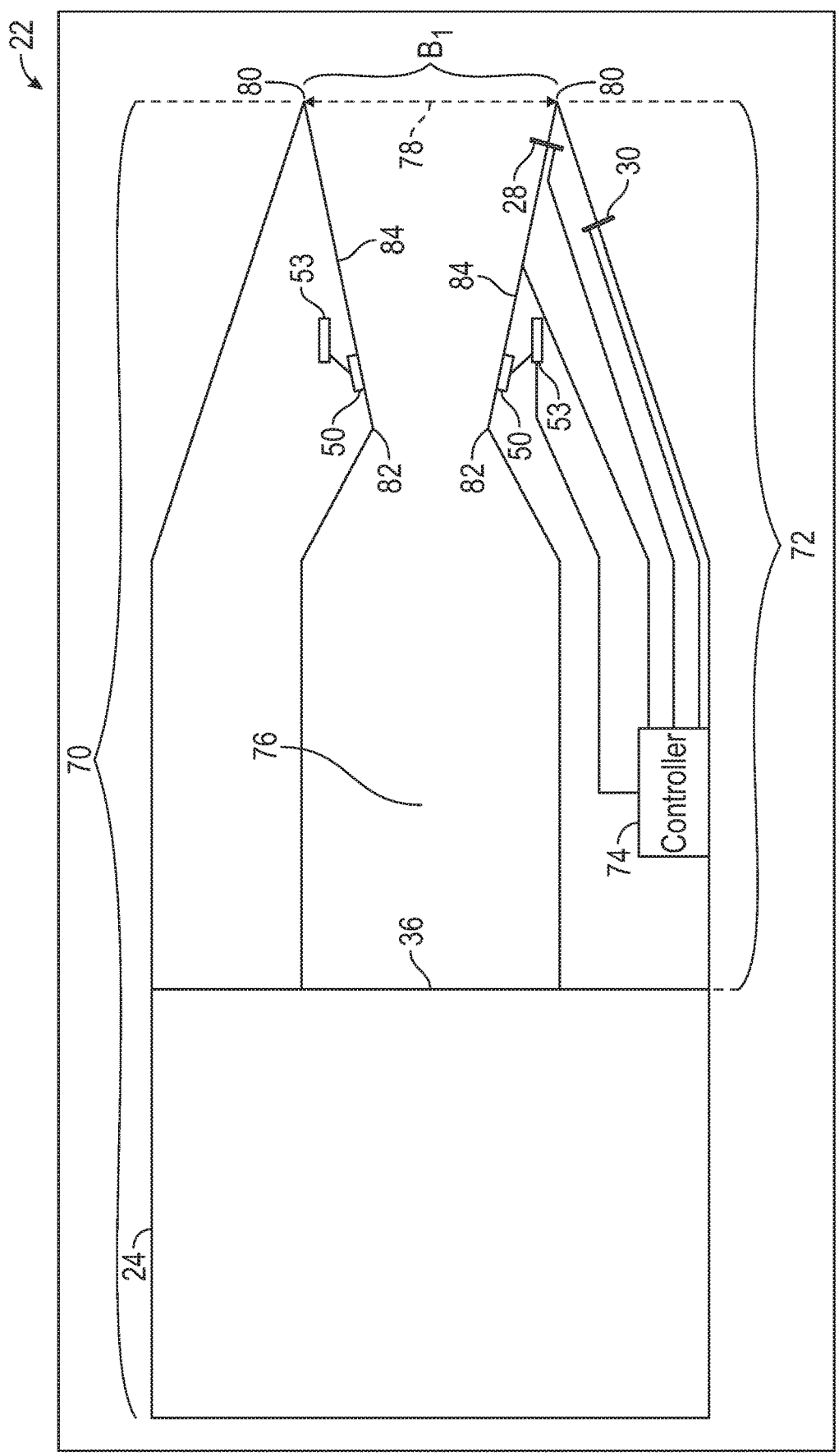
FIG. 6 is a schematic view illustrating another non-limiting embodiment of a propulsion system for an aircraft made in accordance with the teachings of the present disclosure.

In FIG. 4, controller 32 has controlled deployable obstructer 50 to pivot in the direction indicated by arrow 55 from the retracted position (shown in FIGS. 1-3) to the deployed position (shown in FIG. 4). In another embodiment, rather than pivoting, deployable obstructer 50 may move from the retracted position to the deployed position in a motion similar to extrusion. In another embodiment, deployable obstructer 50 may extend from the retracted position to the deployed position in a manner similar to the telescoping of an antenna. In other embodiments, any suitable configuration that is effective to move deployable obstructer 50 from the retracted position towards the deployed position may be employed.

As illustrated, when deployable obstructer 50 is disposed in the deployed position, deployable obstructer 50 extends into pathway 38 and assumes a position transverse to the movement of mass flow 54 (see FIGS. 2 and 3). In this position, deployable obstructer 50 obstructs pathway 38 and introduces pressure disruption into mass flow 54 which leads to the reduced mass flow rate discussed above. To address this condition, when deployable obstructer 50 is moved to the deployed position, controller 32 controls throat 40 to enlarge to throat 40'. Throat 40' has a cross-sectional area of A1'. As illustrated, cross-sectional area A1' is greater than cross-sectional area A1. By enlarging the cross-sectional area of throat 40, controller 32 permits an increase in the mass flow rate through throat 40. This increase in the mass flow rate caused by enlarging throat 40 can be precisely controlled by controller 32 using the equations discussed above. In this manner, controller 32 can precisely offset the reduction in the mass flow rate caused by the introduction of pressure disruption to mass flow 54 through an expansion of throat 40.

However, as throat 40 is enlarged, trailing edge 42 and the cross-sectional area A2 of exit plane 48 are correspondingly enlarged to trailing edge 42' and cross-sectional area A2'. As trailing edge 42 is enlarged, the divergence of pathway 38 aft of throat 40 increases. This increased divergence of pathway 38 permits an increased expansion of mass flow 54 as it moves towards trailing edge 42'. This increased expansion of mass flow 54 will necessarily result in a reduction in the static pressure of mass flow 54 at trailing edge 42. Controller 32 is configured to take this reduction in static pressure of mass flow 54 into consideration when determining an appropriate amount of pressure disruption to introduce into mass flow 54 with deployable obstructer 50 and when determining an appropriate size for throat 40.

With continuing reference to FIGS. 1-2, and 4, FIG. 5 illustrates propulsion system 20 after controller 32 has given instructions to: (1) throat 40 to enlarge, and (2) deployable obstructer 50 to deploy and introduce pressure disruption into mass flow 54. As illustrated, the over-expanded condition of mass flow 54 has been alleviated and the static pressure of mass flow 54 is now equal to the ambient pressure of freestream 56. Consequently, when mass flow 54 encounters freestream 56 at trailing edge 42, freestream 56 no longer compresses mass flow 54 (now exhaust plume 54) and the negative consequence described above with respect to FIG. 2 have been avoided.

With continuing reference to FIGS. 1 and 3, when the disparity between the static pressure of mass flow 54 and ambient pressure 56 arises from a condition wherein mass flow 54 is under-expanded, controller 32 is configured to enlarge trailing edge 42 to permit mass flow 54 to expand further, and in some cases, to expand fully prior to encountering freestream 56. Such further expansion of mass flow 54 will result in a reduction in the static pressure of mass flow 54. Depending on the extent to which mass flow 45 is under-expanded, controller 32 is configured to enlarge trailing edge 42 to the point where mass flow 54 is either further expanded or fully expanded and the disparity between the static pressure of mass flow 54 and the ambient pressure of freestream 56 has been reduced or completely dissipated, respectively.

The extent to which trailing edge 42 must be enlarged to permit an appropriate amount of expansion of mass flow 54 can be determined by controller 32 through the use of look-up tables which can be determined apriori. Alternatively, controller 32 can determine in real time the appropriate amount of enlargement for trailing edge 42 that is needed to bring the disparity between the ambient pressure of the freestream and the static pressure of the mass flow to within some predetermined tolerance using equations that are well known to those of ordinary skill in the art.

In this manner, controller 32 can precisely tailor the dimensions of trailing edge 42 to permit an appropriate amount of expansion of mass flow 54 to promote an equalization of the static pressure of mass flow 54 with the ambient pressure of freestream 56. This, in turn, would eliminate the under-expanded condition of mass flow 54 which, in turn, would avoid the ballooning expansion of exhaust plume 54 and the negative consequences arising therefrom.

However, when controller 32 enlarges trailing edge 42, throat 40 also becomes enlarged (this is not an issue when the dimensions of trailing edge 42 and the dimensions of throat 40 can be independently controlled, as discussed below). As discussed above, when throat 40 is enlarged, the mass flow rate of mass flow 54 increases. Such an increase in mass flow rate is undesirable because this would have the effect of reducing the back pressure acting on aft end 36 of engine 24 which, in turn, would unload the turbomachinery of engine 24 which, in turn, would cause engine 24 to perform sub-optimally. This is undesirable.

With continuing reference to FIGS. 1-3, FIG. 4 illustrates a solution to the secondary problem of enlarging throat 40 and increasing the mass flow rate of mass flow 54. For simplification, the illustration presented in FIG. 4 omits mass flow 54, freestream 56, controller 32, and the pressure sensors 28 and 30.

Controller 32 enlarges trailing edge 42 to an enlarged dimension illustrated by trailing edge 42'. The enlarged dimension of trailing edge 42' permits mass flow 54 to fully expand. This action also expands throat 40 to an enlarged dimension illustrated by throat 40', which, as discussed above, permits an increased mass flow rate. To counteract this increased mass flow rate, controller 32 is further configured to control deployable obstructer 50 to deploy to a position where it will add an amount of obstruction to pathway 38 (i.e., it will partially obstruct pathway 38). The amount of obstruction caused by this deployment will result in a corresponding amount of pressure disruption to mass flow 54. This pressure disruption will reduce the density of mass flow 54 which, in turn, reduces the mass flow rate of mass flow 54. Controller 32 is configured to determine an appropriate amount of obstruction needed to reduce the mass flow rate in order to offset the increase in mass flow rate caused by enlarging throat 40 to throat 40'.

However, as deployable obstructer 50 introduces pressure disruption to mass flow 54, the static pressure of mass flow 54 increases. As the static pressure of mass flow 54 is increased, the enlarged dimension of trailing edge 42 that will be needed to permit mass flow 54 to become fully expanded also increases. Controller 32 is configured to take this increase in static pressure of mass flow 54 into consideration when determining an appropriate size for trailing edge 42'.

With continuing reference to FIGS. 1 and 3-4, FIG. 5 illustrates propulsion system 20 after controller 32 has given instructions to (1) trailing edge 42 to enlarge and (2) deployable obstructer 50 to introduce pressure disruption to mass flow 54. As illustrated, the under-expanded condition of mass flow 54 has been alleviated and the static pressure of mass flow 54 is now equal to the ambient pressure of freestream 56. Consequently, when mass flow 54 encounters freestream 56 at trailing edge 42, mass flow 54 (now exhaust plume 54) no longer balloons out into freestream 56 and the negative consequence described above with respect to FIG. 3 have been avoided.

The solution discussed above (opening throat 40 and introducing pressure disruption into mass flow 54) provides two additional benefits beyond simply addressing the primary issue of an over-expanded or an under-expanded flow. First, when introducing pressure disruption into mass flow 54 and opening throat 40, there is a performance boost that may increase the net propulsive force generated by propulsion system 20. This is because expanded trailing edge 42 reduces the boat tail angle and therefore reduces the drag acting on nozzle 26. This reduction in drag may manifest as an increase in propulsive force. Second, the reduced boat tail angle reduces the strength of any shock that is caused by the freestream interacting with the exhaust plume. Accordingly, actuating the solution discussed above not only resolves or mitigates the primary issue of a mismatch between mass flow static pressure and freestream ambient pressure, but it also enhances thrust and reduces the magnitude of any sonic boom caused by aircraft 22 when flying off-design as supersonic speeds.

When propulsion system 20 is configured with deployable obstructer 50 disposed upstream of throat 40, then the solution to both an under-expanded condition of the mass flow and an over-expanded condition of the mass flow is to open throat 40 and to add an amount of pathway obstruction to cause a pressure disruption of the mass flow. As set forth below, the solution differs when deployable obstructer 50 is disposed downstream of throat 40.

With continuing reference to FIGS. 1-5, FIG. 6 is a schematic view illustrating another embodiment of a propulsion system 70 made in accordance with the teachings disclosed herein for use with aircraft 22. Propulsion system 70 includes engine 24, a nozzle 72, static pressure sensor 28, ambient pressure sensor 30, deployable obstructer 50, and a controller 74. Because all of the components of propulsion system 70 are either identical, nearly identical, or similar to the components of propulsion system 20, for the sake of brevity, a detailed description of those components will either be omitted or limited to a discussion of the distinctions between these components and their counterparts from propulsion system 20. In the absence of any discussion of any distinctions, it should be understood that the component, its features, and its performance are identical to those of its counterpart from propulsion system 20.

In the illustrated embodiment, nozzle 72 is a converging-diverging nozzle. Nozzle 72 is fluidly coupled to aft end 36 of engine 24. Nozzle 72 includes a pathway 76 extending therethrough. Nozzle 72 is coupled with engine 24 in a manner such that the mass flow from engine 24 is received in pathway 76. Pathway 76 is configured to direct the mass flow to an exit plane 78. Exit plane 78 is defined by a trailing edge 80 at an aft end of nozzle 72. Beyond exit plane 78 lies the freestream.

Nozzle 72 includes a throat 82 which comprises the location along pathway 76 having the smallest cross-sectional area. Unlike throat 40, which was configured to enlarge and contract to permit propulsion system 20 to manage the mass flow rate, in the illustrated embodiment, throat 82 is not used by propulsion system 70 to manage the mass flow rate passing through pathway 76. Although throat 82 may be configured to enlarge and contract for other purposes, propulsion system 70 is configured to address an under-expanded mass flow and an over-expanded flow without enlarging or contracting throat 82.

Trailing edge 80 is configured to be enlarged and contracted. In contrast to nozzle 26, where the movement of trailing edge 42 was linked with movement of throat 40, in nozzle 72, trailing edge 80 may be enlarged and contracted independently of throat 82. Thus, in nozzle 72, trailing edge 80 can be enlarged and contracted as needed without causing any change in the cross-sectional area of throat 82. Consequently, enlarging and contracting trailing edge 80 will not result in any change in the mass flow rate through pathway 76, provided that trailing edge 80 is not contracted to an extent that it causes the flow approaching exit plane 78 to converge.

Another difference between nozzle 72 and nozzle 26 is the positioning of deployable obstructer 50. While deployable obstructer 50 was disposed upstream of throat 40 in nozzle 26, in nozzle 72, deployable obstructer 50 is disposed downstream of throat 82. An advantage of this arrangement is that the addition of pressure disruption to the mass flow downstream of throat 82 will not have any impact on the mass flow rate through nozzle 82. This is because the mass flow is choked at throat 82. When a mass flow is choked, it moves at the local speed of sound. This precludes the possibility that changes in the pressure of the mass flow downstream of throat 82 can be transmitted upstream. This is because changes in pressure propagate through a medium at the local speed of sound. Because the mass flow at throat 82 is moving downstream at the local speed of sound, a pressure change moving upstream towards throat 82 at the local speed of sound will not make any progress. Therefore, changes in the density or energy level of the mass flow downstream of throat 82 that cause a change in pressure of the mass flow will have no effect on the operating condition of engine 24.

Controller 74 is nearly identical to controller 32 except in a couple of respects. A first distinction is that controller 74 is configured to enlarge and contract trailing edge 80 rather than throat 82. In the embodiment illustrated in FIG. 6, controller 74 is illustrated as being operatively coupled with diverging wall 84. In an embodiment, diverging wall 84 may be coupled with throat 82 via a hinge (not shown), the slope of diverging wall 84 may be increased and decreased by an actuator (not shown), and controller 74 may be operatively coupled with the actuator. Through the coupling with the actuator, controller 74 would be able to increase and decrease the slope of diverging wall 84, thereby enlarging and contracting trailing edge 80, respectively. Any other suitable arrangement, whether now known or hereafter discovered, that is effective to enlarge and contact trailing edge 80 may be employed by propulsion system 70 without departing from the teachings herein.

A second distinction between controller 74 and controller 32 is the way in which controller 74 responds to an over-expanded mass flow and an under-expanded mass flow. This is discussed in detail below.

Controller 74 is configured to obtain the static pressure of the mass flow from static pressure sensor 28 and the ambient pressure of the freestream from ambient pressure sensor 30. Controller 74 is further configured to compare the two pressure readings and determine whether there is a disparity between them. As stated above, in some embodiments, the existence of any deviation between the static pressure reading and the ambient pressure reading will be considered to be a disparity that triggers a response while in other embodiments, a substantial deviation between the pressure readings may be required before controller 74 will construe the deviation as a disparity that provokes a response by controller 74.

Figure 7:
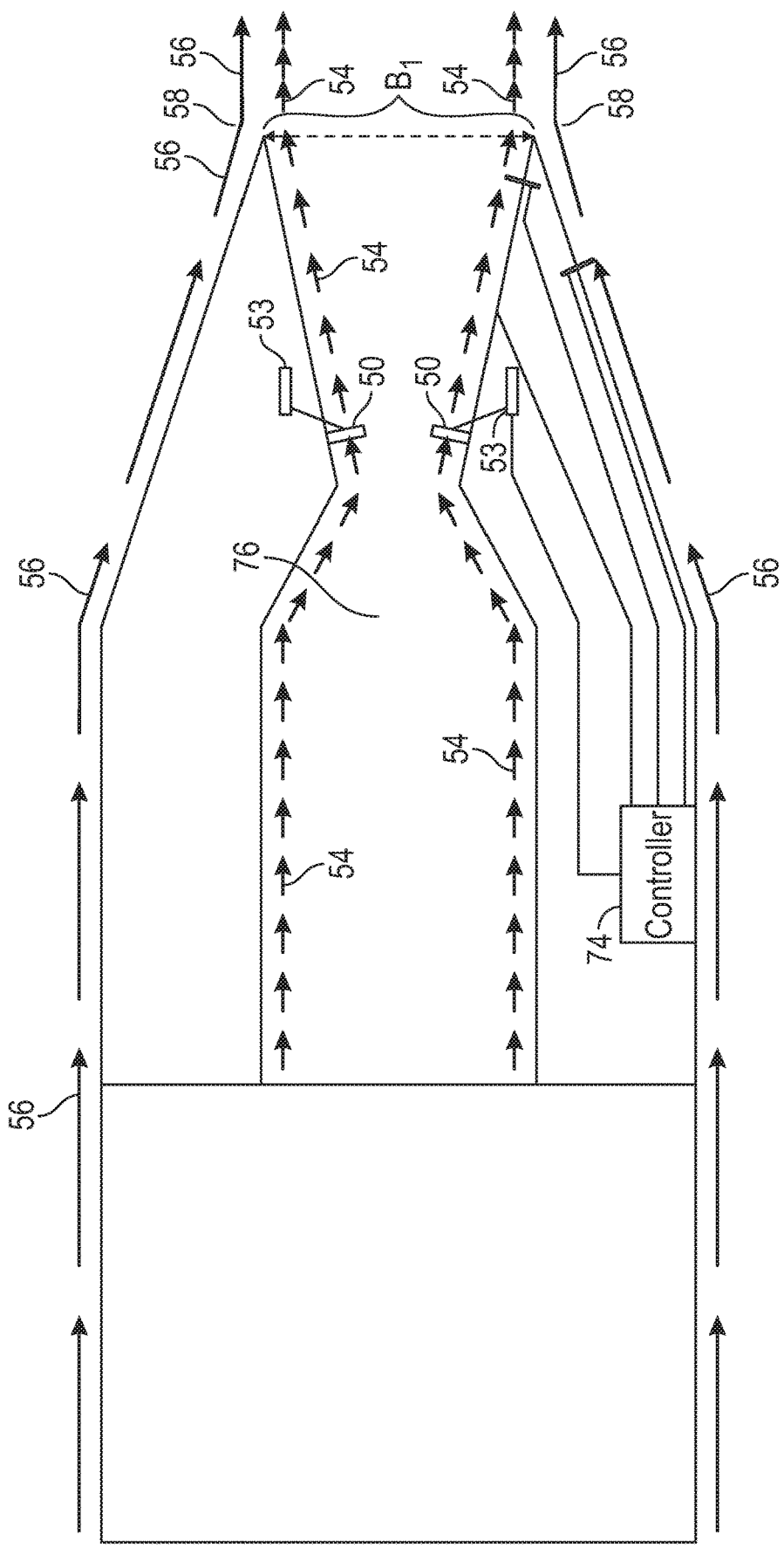
FIG. 7 is a schematic view illustrating the propulsion system of FIG. 6 during actuation of a first countermeasure in response to detection of an over-expanded exhaust plume.

When the disparity between the static pressure of the mass flow and the ambient pressure of the freestream indicates that the mass flow is over-expanded, as illustrated in FIG. 2, controller 74 is configured to respond by adding an amount of obstruction to pathway 76 to introduce pressure disruption into the mass flow, as illustrated in FIG. 7. As illustrated in FIG. 7, deployable obstructers 50 are disposed in the deployed position where they are situated in an orientation that is transverse to the flow.

With respect to FIG. 7, and with continuing reference to FIGS. 1-6, controller 74 is configured to calculate an amount of obstruction of pathway 76 that is needed to diminish the velocity of the mass flow by an amount that will increase the mass flow's static pressure to offset the disparity between the static pressure of the mass flow and the ambient pressure of the freestream. Controller 74 will then actuate deployable obstructers 50, causing deployable obstructers 50 to move out of the retracted position by an amount that will yield the calculated amount of obstruction. In other embodiments, controller 74 may be configured to introduce incremental amounts of deployment of deployable obstructers 50 and to continuously monitor the disparity during this period of incremental deployment. Once an appropriate amount of obstruction has been added to pathway 76, the velocity of the mass flow will diminish, the static pressure of the mass flow will rise, the disparity will be eliminated or sufficiently reduced, and the over-expanded condition of the mass flow will be resolved. This is illustrated in FIG. 7 at location 58, where mass flow 54 encounters freestream 56. Unlike the over-expanded condition illustrated in FIG. 2, in FIG. 7, freestream 56 does not compress mass flow 54 (now exhaust plume 54) down to a smaller diameter. Rather, at location 58 and all points down stream of location 58, mass flow 54 and freestream 56 flow in parallel.

In the embodiment illustrated in FIG. 7, controller 74 actuates and controls deployable obstructer 50 to add an amount of obstruction to pathway 76 and to disrupt mass flow 54 and reduce its velocity without enlarging trailing edge 80. This is demonstrated in FIGS. 6 and 7 wherein exit plane 78 has a cross-sectional area of B1 both before the obstruction has been added to the pathway 78 (FIG. 6) and after the obstruction has been added to pathway 76 (FIG. 7). This is because enlarging trailing edge 80 would permit the mass flow to expand further prior to crossing exit plane 78, thereby increasing the disparity between the static pressure of the mass flow and the ambient pressure of the freestream. Accordingly, unlike propulsion system 20, where the addition of an amount of obstruction of pathway 38 required a compensating adjustment of throat 40, with propulsion system 70, an amount of obstruction can be added to pathway 76 without creating the need to adjust trailing edge 80.

In other embodiments, however, controller 74 may be configured to both add an amount of obstruction to pathway 76 and to also enlarge trailing edge 80. In such embodiments, controller 74 is configured to take the increased disparity caused by enlarging trailing edge 80 into consideration when calculating the amount of obstruction required to offset the (now increased) disparity. While this second embodiment may require additional obstruction, it provides the benefit of reducing the boat tail angle and thereby reducing drag and the magnitude of the sonic boom.

Figure 8:
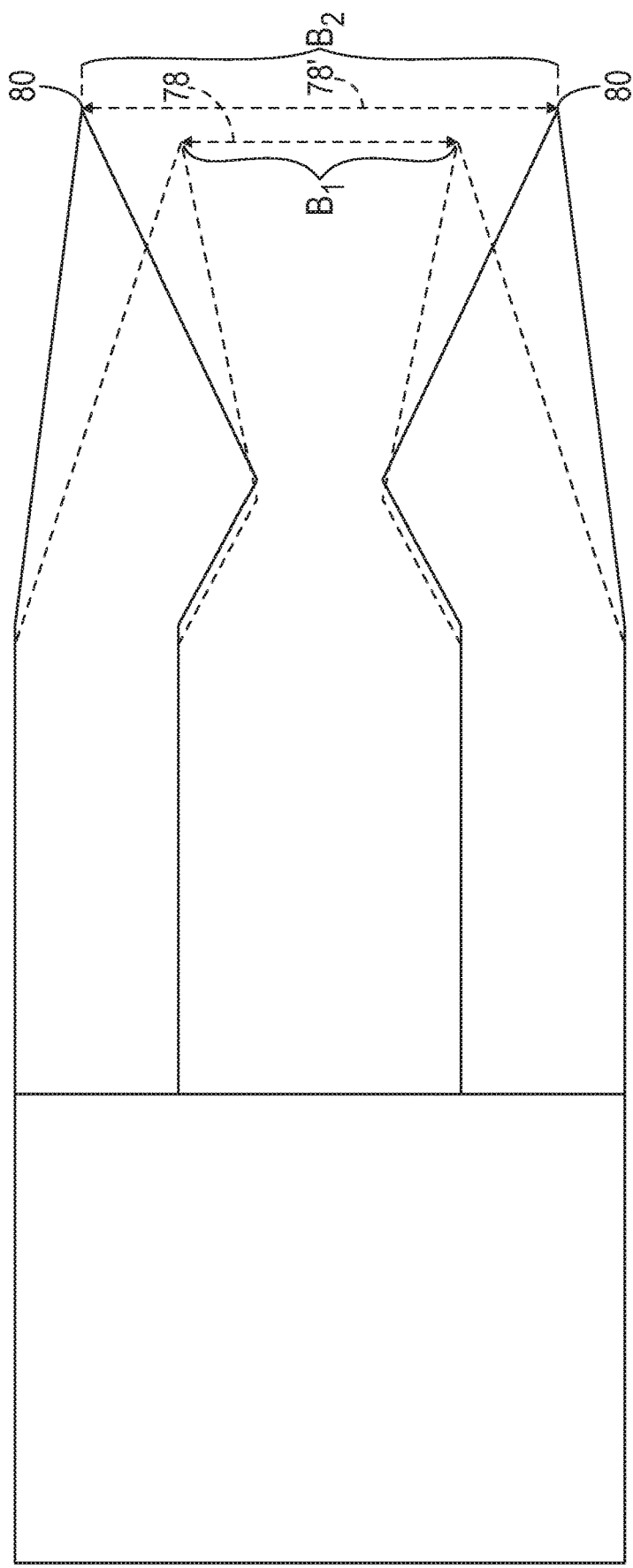
FIG. 8 is a schematic view illustrating the propulsion system of FIG. 6 during actuation of a second counter measure that is configured to correct an under-expanded exhaust plume.
Figure 9:
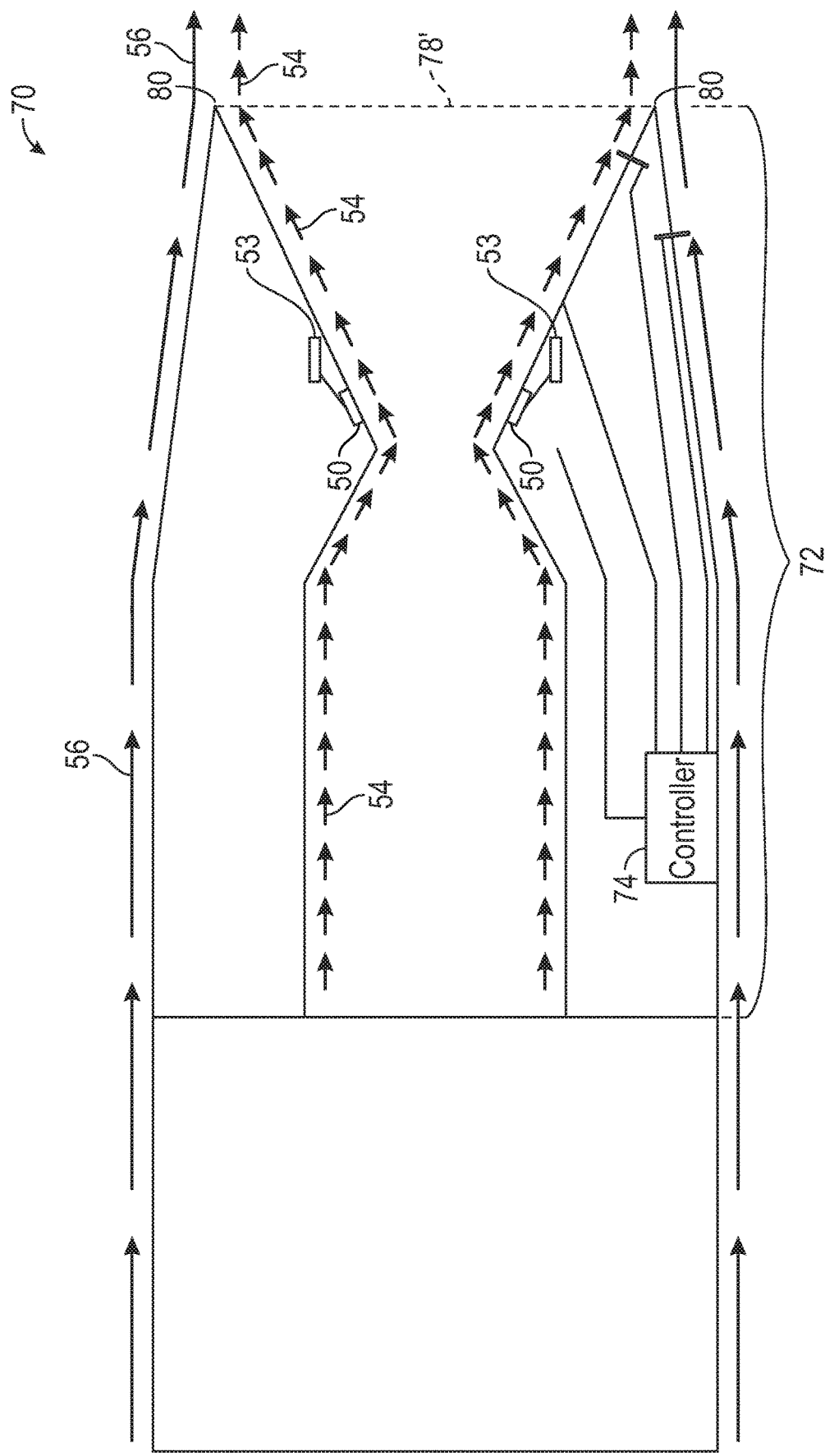
FIG. 9 is a schematic view illustrating the propulsion system of FIG. 8 during actuation of the second countermeasure in response to detection of the over-expanded exhaust plume.

When the disparity between the static pressure of the mass flow and the ambient pressure of the freestream indicates that the mass flow is under-expanded, as illustrated in FIG. 3, controller 74 is configured to respond by enlarging trailing edge 80, thereby increasing the cross-sectional area of exit plane 78, as indicated in FIGS. 8-9.

With continuing reference to FIGS. 1-7, in FIG. 8, trailing edge 80 moves from an initial position illustrated by phantom lines and having an exit plane 78 with a cross-sectional area of B1 to an enlarged position illustrated in solid lines and having an exit plane 78' with a cross-sectional area of B2, where B2 is greater than B1. The enlarged position of trailing edge 80 is calculated to permit mass flow 54 to further expand, causing its static pressure to diminish. Once the static pressure of mass flow 54 reaches the same pressure as the ambient pressure of freestream 56, mass flow 54 will be "fully expanded". This is desirable. Accordingly, the precise dimensions for trailing edge 80 will be calculated to permit mass flow 54 to fully expand as it reaches exit plane 78'.

To make this calculation, controller 74 may be loaded with look-up tables containing information determined apriori. In other embodiments, controller 74 may be configured to perform the necessary calculations in real time.

As illustrated in FIG. 9, once trailing edge 80 has been enlarged, the under-expanded condition and consequential ballooning out of mass flow 54 as it passes exit plane 78 is eliminated. Instead, downstream of exit plane 78, mass flow 54 (now exhaust plume 54) flows parallel to freestream 56.

As illustrated in FIGS. 8 and 9, when controller 74 enlarges trailing edge 80, it does so without actuating deployable obstructer 50. This is because, unlike in propulsion system 20 where throat 40 was enlarged and mass flow 54 had to have its density reduced in order to maintain a constant mass flow rate, with propulsion system 70, the enlarging of trailing edge 80 does not have any effect on the mass flow rate through nozzle 72 so there is no need to modulate its density with deployable obstructer 50. However, it may be desirable to obtain a shallower boat tail angle than what is called for by the calculations to enlarge trailing edge 80. If that is the case, controller 74 is further configured to actuate deployable obstructer 50 to introduce pressure disruption into mass flow 54. Such pressure disruption will increase the static pressure of mass flow 54 and that, in turn, will require a further enlargement of trailing edge 80 which will yield a smaller boat tail angle. In such embodiments, controller 74 may first select a desired boat tail angle and then, working backwards from that, controller 74 may determine an appropriate amount of pressure disruption to introduce through actuation of deployable obstructer 50.

With continuing reference to FIGS. 1-9, FIG. 10 is a fragmented, schematic side view illustrating a portion of internal surface 52 and deployable obstructer 50. This figure illustrates various positions at which deployable obstructer 50 may be disposed. For example, at position A, where deployable obstructer 50 has been illustrated with solid lines, deployable obstructer 50 is disposed in a fully deployed position. In position A, deployable obstructer 50 is substantially perpendicular to internal surface 52. Oriented in this manner, deployable obstructer 50 is able to provide its maximum amount of obstruction to the adjacent pathway (e.g., pathways 38 and 76). In other embodiments, a fully deployed position for deployable obstructer 50 may comprise any other orientation desired by the propulsion system designer.

Oriented as illustrated at position A, deployable obstructer 50 presents an orthogonally oriented obstacle to the mass flow, such that when the mass flow encounters deployable obstructer 50 at position A, the mass flow will have to deviate from its otherwise straight path and go over or around deployable obstructer 50. This will disrupt the total pressure of the mass flow and diminish its downstream speed by a quantifiable amount. Using one or more deployable obstructers 50 deployed to position A, controllers 32 and 74 can generate the desired amount of pathway obstruction needed to yield the desired amount of pressure disruption and velocity diminution.

At position B, deployable obstructer 50 has been illustrated in phantom lines in multiple positions. Each of the positions associated with position B illustrate deployable obstructer 50 positioned between its retracted position and its fully deployed position. In some embodiments, deployable obstructer 50 may be configured to reside in only the retracted position and the fully deployed position (i.e., the deployed position) and simply passes through position B as it moves back and forth between the retracted and fully deployed positions. In other embodiments, deployable obstructer 50 may be configured to reside at any intermediate position between the retracted position and the fully deployed position. In some embodiments, this may be accomplished through any suitable mechanical means for supporting deployable obstructer 50 at an intermediate station between the retracted and the fully deployed positions. For example, there may be detents located at intermediate stations to support deployable obstructers 50 at discrete intermediate positions. In other embodiments, the controller (controller 32 or controller 74) may be configured to partially deploy deployable obstructer 50 to any intermediate position to provide an intermediate amount of obstruction to the adjacent pathway. For example, in the illustrated embodiment, actuator 53 uses a telescoping strut 57. Controllers 32 and 74 may be configured to control actuator 53 to partially extend telescoping strut 57 in a manner that permits deployable obstructer 50 to be supported at any intermediate position between the retracted position and the fully extended position.

When deployable obstructer 50 is disposed in position B, deployable obstructer 50 partially obstructs the adjacent pathway and presents a transversely oriented obstacle to the oncoming mass flow as it moves down stream. The mass flow will be partially redirected by deployable obstructer 50. This will disrupt the total pressure of the mass flow and reduce its velocity by an amount less than the pressure disruption and velocity diminution obtained through a full deployment of deployable obstructer 50 to position A. Therefore, deployment of deployable obstructer 50 to any orientation within position B provides a further means by which the controller (e.g., controller 32 and 74) can modulate the amount of pressure disruption and velocity diminution introduced into the mass flow.

At position C, where deployable obstructer 50 has been illustrated in phantom lines, deployable obstructer 50 is disposed in a retracted position. When deployable obstructer 50 is disposed in the retracted position, it is substantially flush with internal surface 52 and provides substantially no obstruction to the mass flow moving through the adjacent pathway. Controllers 32 and 74 will retain deployable obstructer 50 in the retracted position until it detects a disparity between the ambient pressure and the static pressure of the mass flow. Once detected, controller 32 and 74 may deploy obstructer 50 to the fully deployed position (position A) or to any suitable intermediate position (position B) if such deployment is called for by the circumstances.

Figure 10:
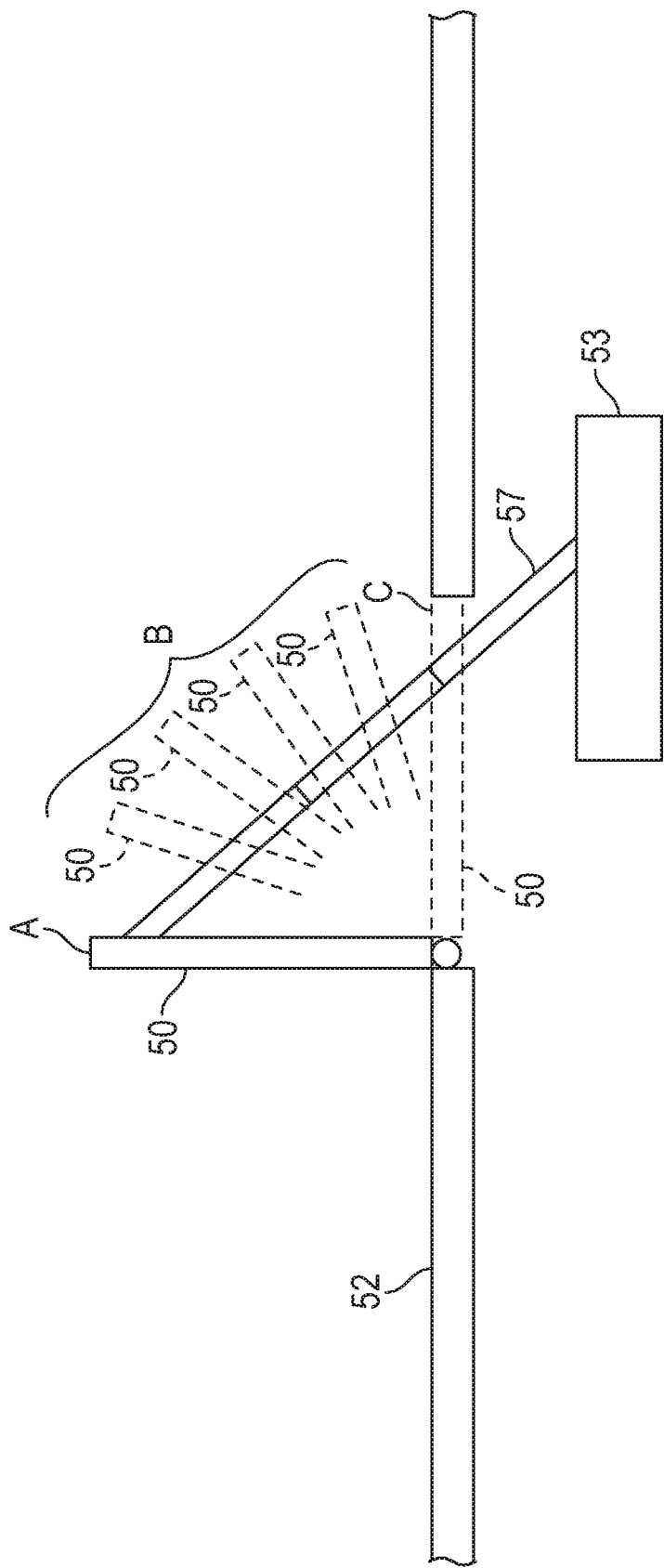
FIG. 10 is a fragmented, schematic side view illustrating a portion of the propulsion system of FIG. 1 depicting a deployable obstructer during actuation to multiple states of deployment.

In FIG. 10, deployable obstructer 50 has been illustrated as a member that is configured to pivot between retracted position C and deployed position A. It should be understood that in other embodiments, deployable obstructer 50 may have any other suitable configuration effective to permit it to move between retracted position C and deployed position A. For example, and without limitation, in other embodiments deployable obstructer 50 may have a telescoping configuration that permits it to telescope between the retracted and deployed positions. In other embodiments, deployable obstructer 50 may comprise a member that is configured to be extruded and retracted between the retracted and deployed position through an opening in internal surface 52. In still other embodiments, any other suitable configuration effective to permit movement between a retracted and deployed position may be employed.

With continuing reference to FIGS. 1-10, FIGS. 11-14 are schematic axial views illustrating a portion of a propulsion system such as propulsion systems 20 and 70, discussed above. Each of these figures illustrates a nozzle 90 having a pathway 92 extending therethrough. Pathway 92 is bounded by an interior surface 94. Integrated within interior surface 94 are deployable obstructers 96. Deployable obstructers 96 may be positioned upstream or downstream of the nozzle throat (not shown). Deployable obstructers 96 are controlled by a controller (not shown).

Figure 11:
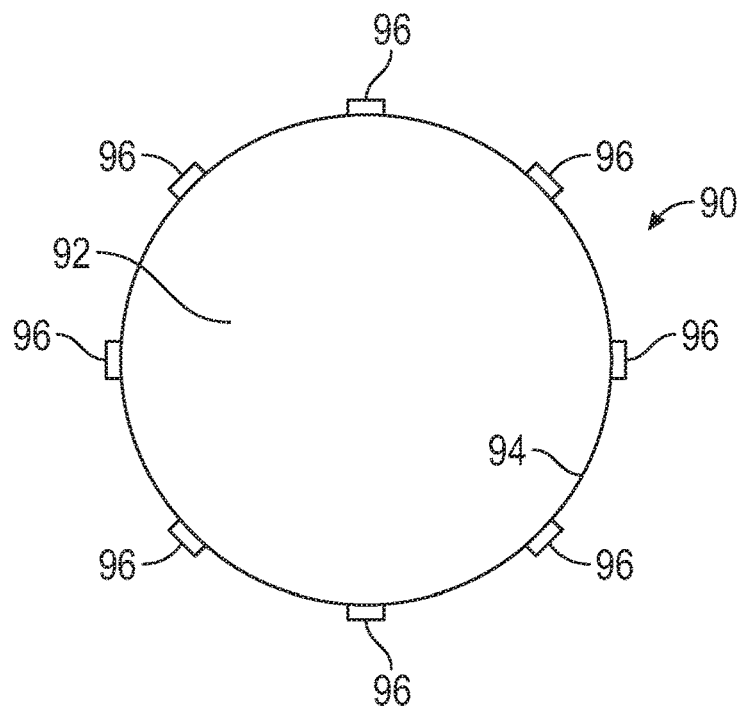
FIGS. 11-14 are schematic, axial views illustrating a portion of a propulsion system and depicting a plurality of deployable obstructers employed by the propulsion system in various combinations of deployment.

In FIG. 11, each of the deployable obstructers 96 are disposed in its retracted position. In this configuration, pathway 92 is unobstructed and any mass flow passing through pathway 92 will be unimpeded by deployable obstructers 96.

Figure 12:
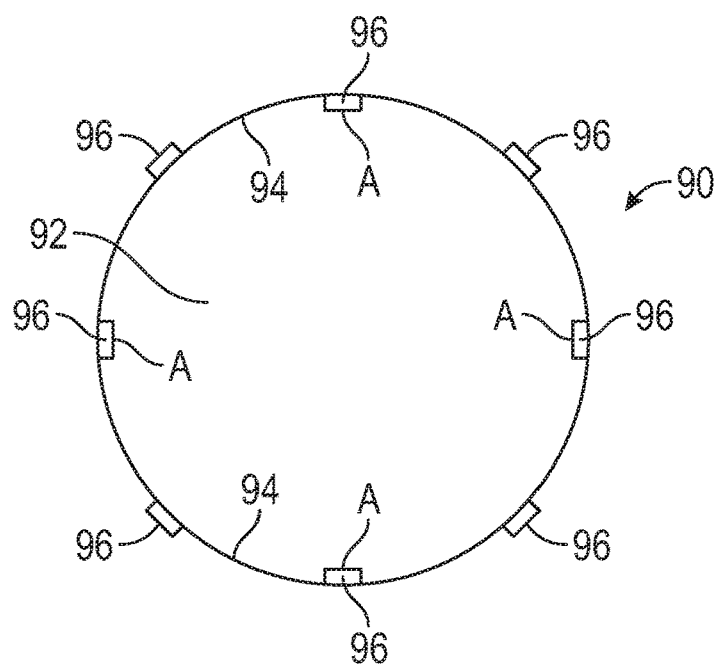

In FIG. 12, each of the deployable obstructers 96 having the annotation "A" have been deployed and are positioned to provide an amount of obstruction to pathway 92. In this figure, the deployable obstructers 96 having the annotation "A" have been deployed in an axisymmetric pattern. This pattern of deployment may be designed to bring about a relatively uniform pressure disruption of the mass flow, meaning that the diminution of the mass flow's total pressure will be circumferentially evenly distributed throughout the mass flow. This pattern of deployment will also yield a circumferentially evenly distributed diminution in mass flow velocity.

By deploying only those deployable obstructers 96 having the annotation "A" and by retaining the remaining deployable obstructers in their retracted positions, the controller has implemented a measured response to a hypothetical moderate disparity between the ambient pressure of the free stream and the static pressure of the mass flow. In some embodiments, the controller may be able to individually deploy or retract the deployable obstructers 96, as needed, to adapt to a changing disparity between the ambient pressure of the free stream and the static pressure of the mass flow. For example, if the disparity between the static and ambient pressure begins to worsen, the controller may be configured to deploy one additional deployable obstructer 96, and then another and another until the increase in disparity has been addressed. This provides the controller with a measure of flexibility in responding to changing conditions. Additionally, as discussed above with respect to FIG. 10, the controller may be configured to control the extent to which each deployable obstructer 96 is deployed. In such an embodiment, the controller may be able to partially deploy each deployable obstructer 96. For example, the controller may be configured to deploy each deployable obstructer 96 to either a uniform or an individually tailored intermediate position between its retracted position and its fully deployed position. This provides the controller with a further measure of flexibility when responding to varying levels and/or changing levels of pressure disparity.

Figure 13:
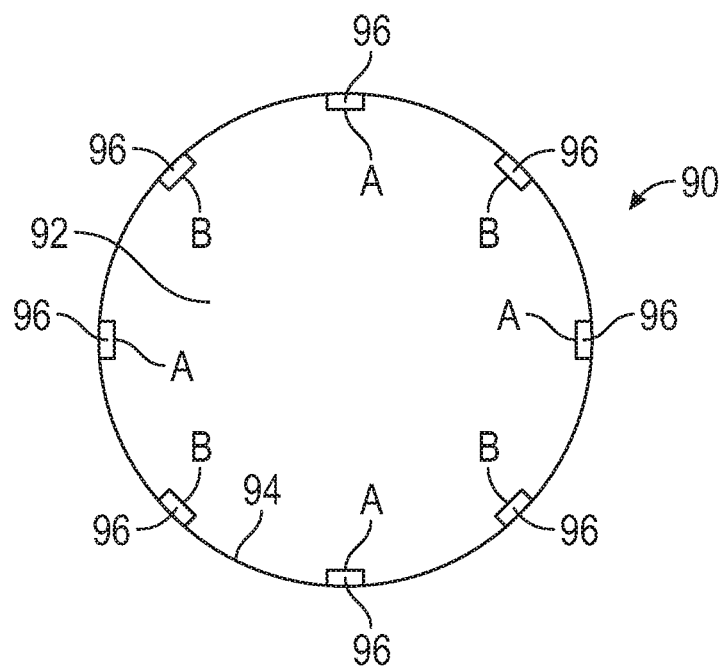

In FIG. 13, each of the deployable obstructers 96 having the annotation "B" have now also been deployed and are positioned to provide an added amount of obstruction to pathway 92 in addition to the amount of obstruction already being provided by deployable obstructers 96 having the annotation "A". As illustrated, these deployable obstructers 96 have also been deployed in an axisymmetric pattern and will therefore add a uniform amount of pressure disruption to the mass flow, meaning that the diminution of the mass flow's total pressure will be circumferentially evenly distributed throughout the mass flow as will the diminution in the mass's flow velocity.

With all of the deployable obstructers 96 deployed to their fully deployed positions, the controller has introduced the maximum amount of obstruction to pathway 92 that is available in the present configuration. If more pressure disruption is needed than can be provided by the deployment of all deployable obstructers 96, then it may not be possible to eliminate the disparity between the static pressure of the mass flow and the ambient pressure of the freestream. In such a case, the disparity would merely be diminished.

In some embodiments, there may be a second ring, a third ring, a fourth ring, etc. of deployable obstructers disposed at an upstream or downstream location to provide further obstruction to pathway 92 and further disruption and diminution of the mass flow's total pressure and velocity, respectively. In other embodiments, there may be deployable obstructers 96 disposed at both a location upstream of the throat and downstream of the throat. Additionally, any other suitable configuration that provides a desired amount of obstruction, pressure disruption, and velocity diminution may also be employed without departing from the teachings of the present disclosure.

Figure 14:
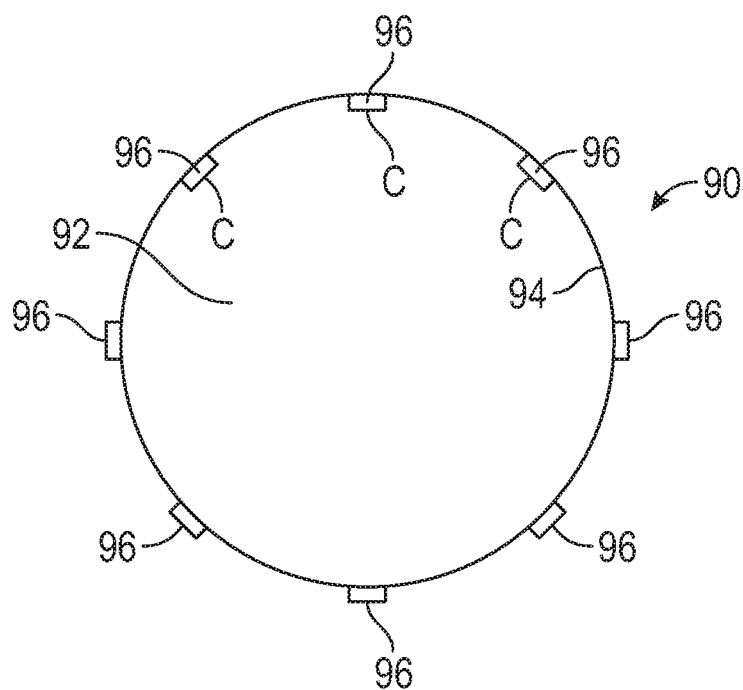

FIG. 14 illustrates an embodiment wherein the controller is configured to control each deployable obstructer 96 individually and the controller is further coupled with a plurality of static pressure sensors disposed circumferentially around the internal surface of nozzle 90 and positioned to measure the static pressure of the mass flow at different circumferential stations around the exit plane of nozzle 90. This allows the controller to determine the existence of a corresponding plurality of disparities between the plurality of static pressures at the different circumferential stations with the ambient pressure of the free stream. In this embodiment, the controller is configured to actuate, control, and modulate each deployable obstructer 96 individually in a manner that would address the specific disparity corresponding with its circumferential position. As illustrated in FIG. 14 for example, only those deployable obstructers 96 having the annotation "C" have been deployed. This is a non-axisymmetric deployment of deployable obstructers 96 and it is intended to yield a non-uniform amount of obstruction to pathway 92. This, in turn, yields a corresponding non-uniform amount of pressure disruption and a corresponding non-uniform amount of mass flow velocity diminution. This provides the propulsion system with needed flexibility to address non-uniform pressure disparities around the exit plane of the nozzle.

With continuing reference to FIGS. 1-14 above, various counter-measures have been disclosed for addressing an under-expanded mass flow and an over-expanded mass flow (referred to collectively, as "off-design conditions"). It should be understood that controller 32 and controller 74 are configured to continuously monitor for such off-design conditions and to continuously adjust the counter-measures employed as the severity of the off-design condition worsens or improves. If the nature of the off-design condition changes (e.g., an over-expanded mass flow changes to an under-expanded mass flow or vice versa), then the nature of the counter-measure employed by controller 32 and controller 74 may, likewise, change. In some embodiments, both the throat and the trailing edge may be configured to enlarge and contract independently of one another. In such embodiments, a controller would be configured with the programming of both controller 32 and controller 74 and may be further configured to assess which counter measure would be the most appropriate in the face of a disparity between the static pressure of the mass flow and the ambient pressure of the freestream.

Figure 15:
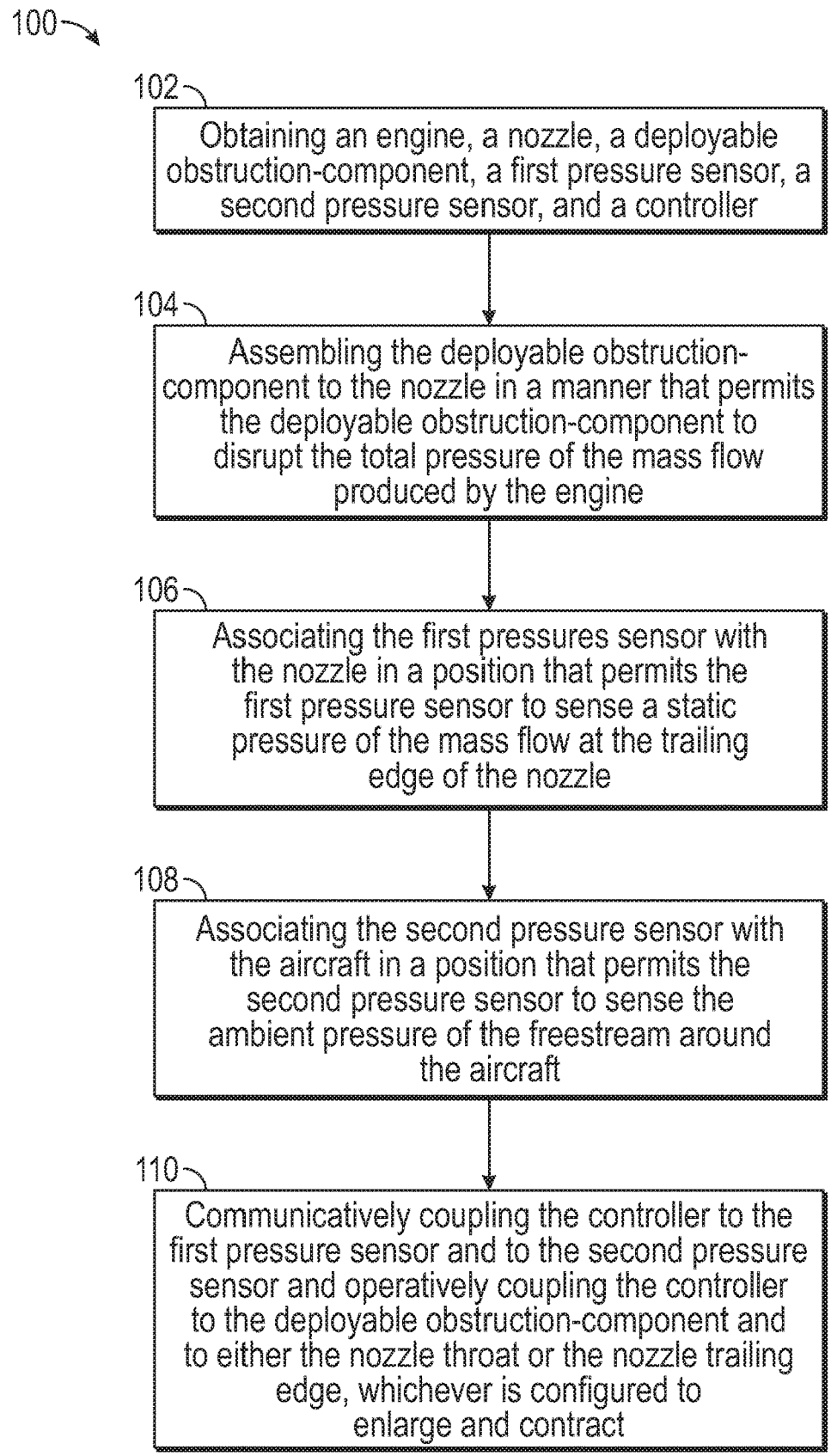
FIG. 15 is a non-limiting example illustrating a method for manufacturing a propulsion system in accordance with the teachings of the present disclosure.

FIG. 15 is a non-limiting example of a method 100 for manufacturing a propulsion system in accordance with the teachings of the present disclosure. The method steps set forth below are presented in an order which facilitates the description of method 100, but it should be understood that the sequence of steps set forth below are not limiting and may be performed in any suitable sequence other than the sequence set forth below and that such other sequence of performance falls within the teachings of the present disclosure.

At step 102, an engine, a nozzle, a deployable obstructer, a first pressure sensor, a second pressure sensor, and a controller are obtained. With continuing reference to FIGS. 1-14, in an embodiment, these components may comprise the components discussed above with respect to propulsion system 20 and propulsion system 70. In other examples, any suitable embodiments of these components may be obtained. For example, any suitable engine configured to generate a mass flow may be obtained. Also, any suitable nozzle may be obtained so long as either its throat or its trailing edge (or both) are configured to be enlarged and contracted. Further, any suitable processor may be obtained so long as it is configured to employ the countermeasures described above for resolving an over-expanded mass flow or an under-expanded mass flow.

At step 104, the deployable obstructer is assembled to the nozzle. In embodiments where the throat of the nozzle is configured to enlarge and contract, the deployable obstructer will be assembled to the nozzle at a location upstream of the throat. In embodiments where only the trailing edge of the nozzle is configured to enlarge and contract, the deployable obstructer will be assembled to the nozzle at a location downstream of the throat. In some embodiments, multiple deployable obstructers may be employed by the propulsion system and therefor, at step 104, multiple deployable obstructers would be assembled to the nozzle.

At step 106, the first pressure sensor is associated with the nozzle so as to detect the static pressure of the mass flow at the trailing edge of the nozzle. In some embodiments, the first pressure sensor may be assembled to an internal surface of the nozzle at the trailing edge. In other embodiments where the first pressure sensor is configured to use light, laser light, or sound to sense pressure, the first pressure sensor may be mounted at any suitable location that permits sensing the static pressure of the mass flow at an internal surface of the trailing edge.

At step 108, the second pressure sensor is associated with the nozzle so as to detect the ambient pressure of the freestream. In some embodiments, the second pressure sensor may be assembled to an external surface of the nozzle. In some embodiments, the second pressure sensor may be assembled to the nozzle at or proximate the trailing edge. In other embodiments where the second pressure sensor is configured to use light, laser light, or sound to sense pressure, the second pressure sensor may be mounted at any suitable location that permits sensing the ambient pressure of the freestream proximate the nozzle and, in some embodiments, proximate the trailing edge.

At step 110, the controller is communicatively coupled with the first pressure sensor and the second pressure sensor and is operatively coupled with the deployable obstructer and to either the throat or the trailing edge. In embodiments where the throat is configured to enlarge and contract, the controller will be operatively coupled with the throat. In embodiments where the trailing edge is configured to expand and contract, the controller will be operatively coupled with the trailing edge.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the disclosure as set forth in the appended claims.

What is claimed is:

1. A propulsion system for an aircraft, the propulsion system comprising:
  an engine configured to generate a mass flow;
  a nozzle coupled with the engine, the nozzle having a pathway extending therethrough, the pathway configured to guide the mass flow, the pathway including a throat and a trailing edge, the trailing edge defining an exit plane, at least one of the throat and the trailing edge configured to enlarge and contract;
  a first deployable obstructer disposed within the pathway, the first deployable obstructer configured to move between a deployed position and a retracted position, the first deployable obstructer configured to partially obstruct the pathway when the first deployable obstructer is out of the retracted position and to avoid obstructing the pathway when the first deployable obstructer is in the retracted position;
  a first pressure sensor associated with the pathway and disposed to sense a static pressure of the mass flow at the trailing edge;
  a second pressure sensor associated with the aircraft and disposed to sense an ambient pressure of a freestream proximate the aircraft; and
  a controller communicatively coupled with the first pressure sensor and the second pressure sensor and operatively coupled with the first deployable obstructer and with the at least one of the throat and the trailing edge configured to enlarge and contract, the controller configured to obtain the static pressure from the first pressure sensor, to obtain the ambient pressure from the second pressure sensor, to compare the static pressure with the ambient pressure, and in response to a disparity between the static pressure and the ambient pressure, the controller is further configured to control at least one of the first deployable obstructer and the at least one of the throat and the trailing edge configured to enlarge and contract in a manner that reduces the disparity.

2. The propulsion system of claim 1, wherein the throat is configured to expand and contract, wherein the first deployable obstructer is disposed upstream of the throat, and wherein the controller is configured to control the first deployable obstructer to move between the retracted position and the deployed position and to control the throat to enlarge in response to the disparity.

3. The propulsion system of claim 2, wherein the controller is further configured to calculate an amount of obstruction of the pathway needed to slow the mass flow to increase the static pressure of the mass flow at the trailing edge to a level that substantially eliminates the disparity, and the controller is further configured to control the first deployable obstructer to move towards the deployed position to yield the amount of obstruction of the pathway in response to the disparity when the disparity is such that the ambient pressure exceeds the static pressure at the trailing edge.

4. The propulsion system of claim 3, wherein the controller is further configured to calculate a reduced density of the mass flow caused by the first deployable obstructer when the first deployable obstructer is deployed to deliver the amount of obstruction, to further calculate an enlarged throat area needed to avoid a substantial alteration of a mass flow rate of the mass flow through the pathway when the first deployable obstructer is deployed to deliver the amount of obstruction, and the controller is further configured to control the throat to enlarge to the enlarged throat area when the first deployable obstructer is deployed to deliver the amount of obstruction.

5. The propulsion system of claim 2, wherein the trailing edge is coupled with the throat such that when the throat is enlarged and contracted, the exit plane enlarges and contracts, respectively, and such that when the exit plane is enlarged and contracted, the throat enlarges and contracts, respectively, and wherein the controller is configured to respond to the disparity when the disparity is such that the static pressure of the mass flow exceeds the ambient pressure, by:
  a. calculating a dimension for an enlarged exit plane that will permit the mass flow to expand prior to crossing the enlarged exit plane,
  b. calculating an enlarged throat area that corresponds with the enlarged exit plane,
  c. calculating a new density of the mass flow that will be needed to avoid a substantial alteration of a mass flow rate of the mass flow through the pathway when the throat is enlarged to the enlarged throat area,
  d. calculating an amount of obstruction of the pathway needed to reduce a total pressure of the mass flow to achieve the new density, and
  e. controlling the throat to enlarge to the enlarged throat area and controlling the first deployable obstructer to deploy to an extent necessary to deliver the amount of obstruction, whereby the disparity will be reduced.

6. The propulsion system of claim 2, wherein the controller is further configured to control the first deployable obstructer to deploy incrementally by a predetermined incremental amount, to reassess the disparity after the first deployable obstructer has been deployed by the predetermined incremental amount, and to repeat making incremental deployments of the first deployable obstructer followed by reassessing the disparity until the disparity has been reduced to within a predetermined tolerance.

7. The propulsion system of claim 1, wherein the trailing edge is configured to enlarge and contract, and wherein the first deployable obstructer is disposed downstream of the throat.

8. The propulsion system of claim 7, wherein the controller is configured to control the trailing edge to enlarge when the disparity is such that the static pressure exceeds the ambient pressure at the trailing edge.

9. The propulsion system of claim 8, wherein the controller is configured to calculate an expanded area for the exit plane needed to substantially eliminate the disparity and to control the trailing edge to expand to achieve the expanded area.

10. The propulsion system of claim 7, wherein the controller is configured to control the first deployable obstructer to move towards the deployed position to obstruct the pathway when the disparity is such that the ambient pressure exceeds the static pressure.

11. The propulsion system of claim 10, wherein the controller is configured to calculate an amount of obstruction needed to increase the static pressure of the mass flow at the trailing edge to be substantially equal to the ambient pressure and to control the first deployable obstructer to move from the retracted position towards the deployed position to provide the amount of obstruction.

12. The propulsion system of claim 1, wherein the first deployable obstructer comprises a single member tab configured to pivot between the retracted position and the deployed position.

13. The propulsion system of claim 1, further comprising:
  an actuator coupled with the first deployable obstructer and operatively coupled with the controller,
  wherein the actuator is configured to move the first deployable obstructer between the retracted position and the deployed position, and wherein the controller is configured to control the actuator to move the first deployable obstructer.

14. The propulsion system of claim 13, wherein the controller is configured to control the actuator to move the first deployable obstructer to any intermediate position between the retracted position and the deployed position necessary to provide a needed amount of obstruction of the pathway.

15. The propulsion system of claim 1 further comprising:
  a second deployable obstructer disposed within the pathway and operatively coupled with the controller,
  wherein the second deployable obstructer is configured to move between a second deployed position and a second retracted position, the second deployable obstructer is configured to partially obstruct the pathway when the second deployable obstructer is out of the second retracted position and to avoid obstructing the pathway when the second deployable obstructer is in the second retracted position,
  and wherein the controller is configured to control at least one of the first deployable obstructer, the second deployable obstructer, and the at least one of the throat and the trailing edge configured to enlarge and contract in the manner that reduces the disparity.

16. The propulsion system of claim 15, wherein the controller is configured to independently control the first deployable obstructer and the second deployable obstructer.

17. A nozzle for use with a propulsion system of an aircraft and configured for coupling with an engine configured to generate a mass flow, the nozzle comprising:
- a pathway extending through the nozzle, the pathway configured to guide the mass flow, the pathway including a throat and a trailing edge, the trailing edge defining an exit plane, at least one of the throat and the trailing edge configured to enlarge and contract;
- a deployable obstructer disposed within the pathway, the deployable obstructer configured to move between a deployed position and a retracted position, the deployable obstructer configured to partially obstruct the pathway when the deployable obstructer is out of the retracted position and to avoid obstructing the pathway when the deployable obstructer is in the retracted position;
- a first pressure sensor associated with the pathway and disposed to sense a static pressure of the mass flow at the trailing edge;
- a second pressure sensor associated with an external surface of the nozzle and disposed to sense an ambient pressure of a freestream proximate the aircraft; and
- a controller communicatively coupled with the first pressure sensor and the second pressure sensor and operatively coupled with the deployable obstructer and with the at least one of the throat and the trailing edge configured to enlarge and contract, the controller configured to obtain the static pressure from the first pressure sensor, to obtain the ambient pressure from the second pressure sensor, to compare the static pressure with the ambient pressure, and in response to a disparity between the static pressure and the ambient pressure, the controller is further configured to control at least one of the deployable obstructer and the at least one of the throat and the trailing edge configured to enlarge and contract in a manner that reduces the disparity.

* * * * *